United States Patent
Billmaier et al.

(10) Patent No.: US 7,159,176 B2
(45) Date of Patent: *Jan. 2, 2007

(54) SYSTEM AND METHOD FOR FOCUSED NAVIGATION WITHIN A USER INTERFACE

(75) Inventors: James A. Billmaier, Woodinville, WA (US); John M. Kellum, Seattle, WA (US); Dewey M. Reid, Woodinville, WA (US); Philip A. Rogan, Bozeman, MT (US)

(73) Assignee: Digeo, Inc., Kirkland, WA (US)

( * ) Notice: Subject to any disclaimer, the term of this patent is extended or adjusted under 35 U.S.C. 154(b) by 433 days.

This patent is subject to a terminal disclaimer.

(21) Appl. No.: 10/138,803

(22) Filed: May 3, 2002

(65) Prior Publication Data

US 2004/0181804 A1    Sep. 16, 2004

Related U.S. Application Data

(60) Provisional application No. 60/324,997, filed on Sep. 26, 2001, provisional application No. 60/317,612, filed on Sep. 6, 2001, provisional application No. 60/315,731, filed on Aug. 29, 2001.

(51) Int. Cl.
*H04N 7/25* (2006.01)
*G06F 3/00* (2006.01)

(52) U.S. Cl. .................. 715/720; 715/719; 715/721; 725/39; 725/41; 725/52

(58) Field of Classification Search ............ 715/719, 715/720, 721; 725/56, 41, 52, 39, 37, 38
See application file for complete search history.

(56) References Cited

U.S. PATENT DOCUMENTS

| | | | |
|---|---|---|---|
| 5,398,074 A | 3/1995 | Duffield et al. ............. 348/564 |
| 5,524,195 A | 6/1996 | Clanton, III et al. ........ 395/155 |
| 5,602,596 A | 2/1997 | Claussen et al. ............ 348/564 |
| 5,606,374 A | 2/1997 | Bertram ...................... 348/565 |
| 5,621,456 A | 4/1997 | Florin et al. .................... 348/7 |
| 5,623,613 A | 4/1997 | Rowe et al. ................. 395/353 |
| 5,663,757 A | 9/1997 | Morales ....................... 348/13 |
| 5,673,401 A | 9/1997 | Volk et al. ................... 395/327 |
| 5,677,708 A * | 10/1997 | Matthews et al. .......... 345/684 |
| 5,682,511 A * | 10/1997 | Sposato et al. ............. 715/716 |
| 5,812,124 A | 9/1998 | Eick et al. ................... 345/327 |
| 5,838,326 A | 11/1998 | Card et al. .................. 345/355 |
| 5,850,218 A * | 12/1998 | LaJoie et al. ................. 725/45 |
| 6,005,601 A * | 12/1999 | Ohkura et al. ................ 725/52 |

(Continued)

FOREIGN PATENT DOCUMENTS

EP       1 028 570 A1    8/2000

OTHER PUBLICATIONS

U.S. Appl. No. 10/138,804, filed May 3, 2002, James A. Billmaier et al.

(Continued)

*Primary Examiner*—Raymond J. Bayerl
*Assistant Examiner*—Dennis G. Bonshock
(74) *Attorney, Agent, or Firm*—Kory D. Christensen; Stoel Rives, LLP

(57) ABSTRACT

A sequence of cards is stored that graphically represents available options within an information system. In response to a single user action, the sequence of cards is successively displayed within a focus area of the user interface. In response to a subsequent user action, the successive display is discontinued to display a particular card representing a selected option.

26 Claims, 16 Drawing Sheets

U.S. PATENT DOCUMENTS

| | | | | |
|---|---|---|---|---|
| 6,020,930 | A | | 2/2000 | Legrand ..................... 348/569 |
| 6,028,600 | A | | 2/2000 | Rosin et al. ................ 345/327 |
| 6,037,933 | A | * | 3/2000 | Blonstein et al. ........... 715/721 |
| 6,151,059 | A | * | 11/2000 | Schein et al. ................ 725/37 |
| 6,163,345 | A | | 12/2000 | Noguchi et al. ............ 348/564 |
| 6,188,406 | B1 | | 2/2001 | Fong et al. ................. 345/348 |
| 6,262,722 | B1 | * | 7/2001 | Allison et al. ............... 725/39 |
| 6,266,059 | B1 | | 7/2001 | Matthews, III et al. ..... 345/352 |
| 6,266,098 | B1 | | 7/2001 | Cove et al. ................. 348/563 |
| 6,281,940 | B1 | * | 8/2001 | Sciammarella ............. 348/564 |
| 6,313,851 | B1 | | 11/2001 | Matthews, III et al. ..... 345/718 |
| 6,344,880 | B1 | | 2/2002 | Takahashi et al. .......... 348/563 |
| 6,418,556 | B1 | | 7/2002 | Bennington et al. ......... 725/40 |
| 6,425,129 | B1 | * | 7/2002 | Sciammarella et al. ....... 725/38 |
| 6,538,672 | B1 | * | 3/2003 | Dobbelaar .................. 715/810 |
| 6,577,350 | B1 | * | 6/2003 | Proehl et al. ............... 348/564 |
| 6,613,100 | B1 | | 9/2003 | Miller ........................ 715/526 |
| 6,642,939 | B1 | * | 11/2003 | Vallone et al. .............. 715/721 |
| 6,678,891 | B1 | | 1/2004 | Wilcox et al. ................ 725/42 |
| 6,690,391 | B1 | | 2/2004 | Proehl et al. ............... 715/720 |
| 6,978,472 | B1 | * | 12/2005 | Nashida et al. ............... 725/52 |
| 2002/0033848 | A1 | * | 3/2002 | Sciammarella et al. ..... 345/838 |
| 2002/0056129 | A1 | | 5/2002 | Blackketter et al. ........ 725/112 |
| 2002/0070958 | A1 | | 6/2002 | Yeo et al. ................... 345/723 |
| 2002/0078440 | A1 | | 6/2002 | Feinberg et al. ............... 725/9 |
| 2002/0152474 | A1 | | 10/2002 | Dudldewicz ................ 725/136 |
| 2003/0001898 | A1 | * | 1/2003 | Bernhardson .............. 345/786 |
| 2003/0052900 | A1 | | 3/2003 | Card et al. .................. 345/660 |
| 2003/0090524 | A1 | * | 5/2003 | Segerberg et al. .......... 345/786 |
| 2003/0093792 | A1 | | 5/2003 | Labeeb et al. ................ 725/46 |

OTHER PUBLICATIONS

U.S. Appl. No. 10/138,805, filed May 3, 2002, James A. Billmaier et al.
U.S. Appl. No. 10/138,810, filed May 3, 2002, James A. Billmaier et al.
U.S. Appl. No. 10/260,738, filed Sep. 30, 2002, Billmaier et al.
U.S. Appl. No. 10/097,174, filed Mar. 12, 2002, Billmaier et al.
U.S. Appl. No. 10/105,088, filed Mar. 22, 2002, Billmaier.
U.S. Appl. No. 10/105,083, filed Mar. 22, 2002, Billmaier.
U.S. Appl. No. 10/097,195, filed Mar. 12, 2002, Billmaier et al.
U.S. Appl. No. 10/108,178, filed Mar. 27, 2002, Billmaier et al.
U.S. Appl. No. 10/113,889, filed Mar. 29, 2002, Billmaier et al.
U.S. Appl. No. 10/107,601, filed Mar. 27, 2002, Billmaier et al.
U.S. Appl. No. 10/113,820, filed Mar. 29, 2002, Billmaier et al.
U.S. Appl. No. 10/186,209, filed Jun. 27, 2002, Istvan et al.
U.S. Appl. No. 10/186,210, filed Jun. 27, 2002, Billmaier et al.
U.S. Appl. No. 10/230,964, filed Aug. 29, 2002, Istvan et al.
U.S. Appl. No. 10/260,700, filed Sep. 30, 2002, Billmaier et al.
U.S. Appl. No. 10/270,738, filed Sep. 30, 2002, Billmaier et al.
U.S. Appl. No. 10/260,208, filed Sep. 30, 2002, Billmaier et al.
U.S. Appl. No. 10/328,754, filed Dec. 23, 2002, Rappaport et al.
U.S. Appl. No. 10/259,199, filed Sep. 27, 2002, Young et al.
U.S. Appl. No. 10/138,810, May 3, 2002, Billmaier et al.
U.S. Appl. No. 10/138,805, filed May 3, 2002, Billmaier et al.
U.S. Appl. No. 10/183,804, filed May 3, 2002, Billmaier et al.
U.S. Appl. No. 60/317,612, filed Sep. 6, 2001, Reid et al.
U.S. Appl. No. 60/324,997, filed Sep. 26, 2001, Reid et al.
U.S. Appl. No. 10/186,094, filed Jun. 29, 2001, Billmaier et al.
U.S. Appl. No. 10/187,118, filed Jun. 29, 2002, Billmaier et al.
U.S. Appl. No. 10/186,095, filed Jun. 29, 2002, Billmaier et al.
U.S. Appl. No. 60/377,627, filed May 3, 2002, Billmaier et al.
U.S. Appl. No. 29/161,708, filed Jun. 3, 2002, Nguyen et al.
U.S. Appl. No. 10/251,366, filed Sep. 20, 2002, Allen et al.
U.S. Appl. No. 10/260,881, filed Sep. 30, 2002, Allen et al.
U.S. Appl. No. 10/320,900, filed Dec. 16, 2002, Kolde et al.
U.S. Appl. No. 10/328,514, filed Dec. 23, 2002, Kolde et al.
Nokia Mediaterminal 511S; www.nokia.com/multimedia/pdf/mediaterminal.pdf; pp. 1-12; Dec. 11, 2001.
Nokia Mediamaster 9470S; http://www.digitv.de/ifa01/nokia9470s.shtml; pp. 1-2; Dec. 11, 2001.

* cited by examiner

SYSTEM AND METHOD FOR FOCUSED NAVIGATION WITHIN A USER INTERFACE

CROSS-REFERENCES TO RELATED APPLICATIONS

The present application is related to and claims priority from U.S. Provisional Application No. 60/315,731, filed Aug. 29, 2001, entitled "System and Method for Visual Channel Surfing," which is hereby incorporated by reference in its entirety. The present application is also related to and claims priority from U.S. Provisional Application No. 60/317,612, filed Sep. 6, 2001, entitled "System and Method for Visual Channel Surfing," which is hereby incorporated by reference in its entirety. The present application is further related to and claims priority from U.S. Provisional Application No. 60/324,997, filed Sep. 26, 2001, entitled "System and Method for Visual Channel Surfing Using Center-Focused Navigation," which is hereby incorporated by reference in its entirety.

BACKGROUND OF THE INVENTION

1. Field of the Invention

The present invention relates generally to the field of information systems. More specifically, the present invention relates to a system and method for focused navigation within a user interface of an information system.

2. Description of the Related Art

Recent advances in technology have vastly increased the number of available options within personal computers (PCs), interactive television (ITV) systems, personal digital assistants (PDAs), cellular telephones, and other information systems. For instance, current ITV systems offer hundreds of broadcast channels and a variety of interactive options, including e-mail, videoconferencing, instant messaging, online banking, online purchasing, and so forth.

Unfortunately, despite technological advances, user interfaces for these systems have remained largely unchanged, making navigation through all of the newly available options no easy task. For example, a user of a modern ITV system must scan through potentially hundreds of channels and other options, often by repeatedly pressing a button on a remote control. Such an outdated approach is far too slow and inconvenient to facilitate effective operation of a modern ITV system.

Similar problems exist with PC interfaces. The graphical user interface (GUI) of a modern PC looks remarkably similar to the first GUI developed twenty years ago. Small icons representing user options are arranged in rows and columns on a graphical representation of a desktop. Many of the icons are identical, requiring the addition of text labels as a distinguishing feature. Typically, a user must individually examine each icon and read each label—a time-consuming process that does not lend itself to effective navigation of the numerous options available in a modern PC.

Accordingly, it would be an advancement in the art to provide a user interface that allows for rapid and efficient navigation of a plurality of options without the drawbacks of conventional approaches.

BRIEF DESCRIPTION OF THE SEVERAL VIEWS OF THE DRAWING(S)

Non-exhaustive embodiments of the invention are described with reference to the figures, in which.

Figure 14:
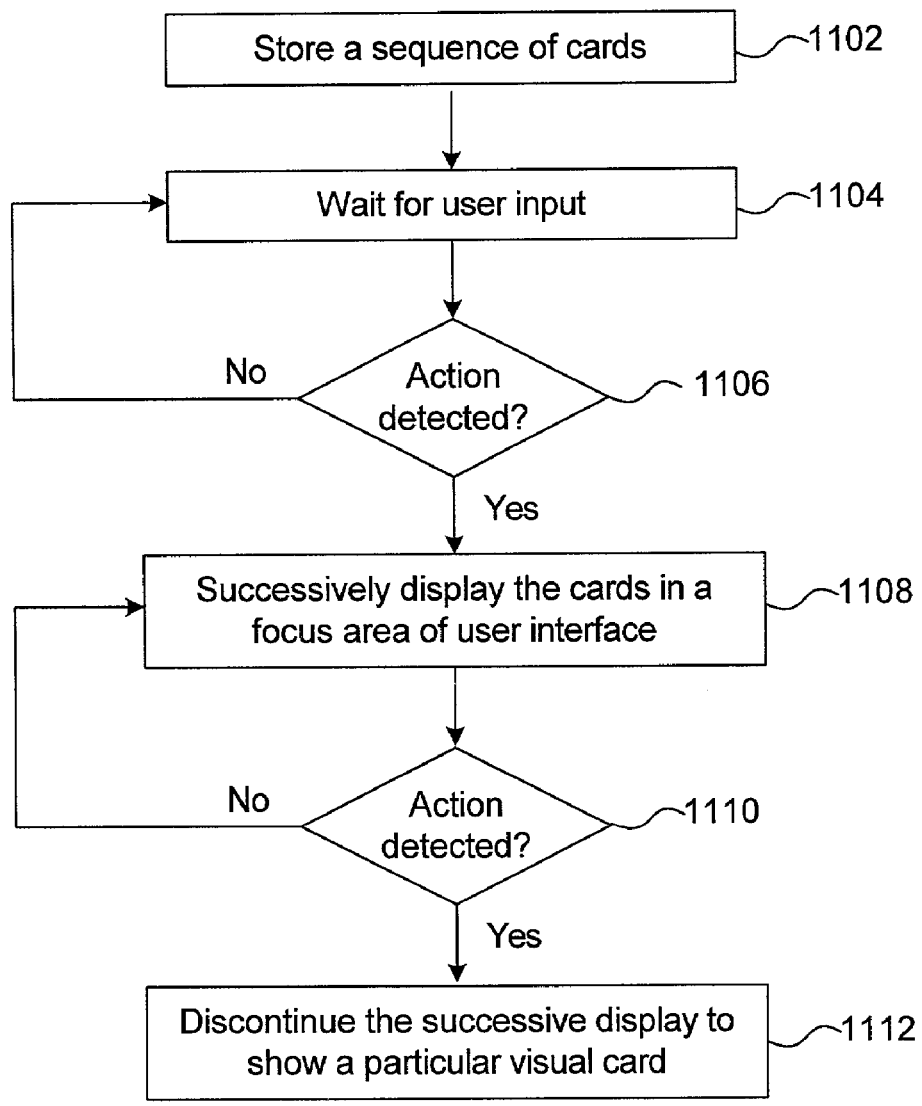

FIG. 14 a flowchart of a method for focused navigation of a plurality of options within a user interface.

DETAILED DESCRIPTION

Reference throughout this specification to "one embodiment" or "an embodiment" means that a particular described feature, structure, or characteristic is included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. In the following description, numerous specific details are provided, such as examples of programming, software modules, user selections, network transactions, database queries, database structures, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the following description makes particular reference to ITV systems, it should be recognized that the present invention may be used in conjunction with any type of information system in which selectable options may be displayed on a display screen. Examples of such information systems include, but are not limited to, ITV systems, personal computers, and mobile computing devices, such as PDAs, webpads, cellular telephones, and the like.

Figure 1:
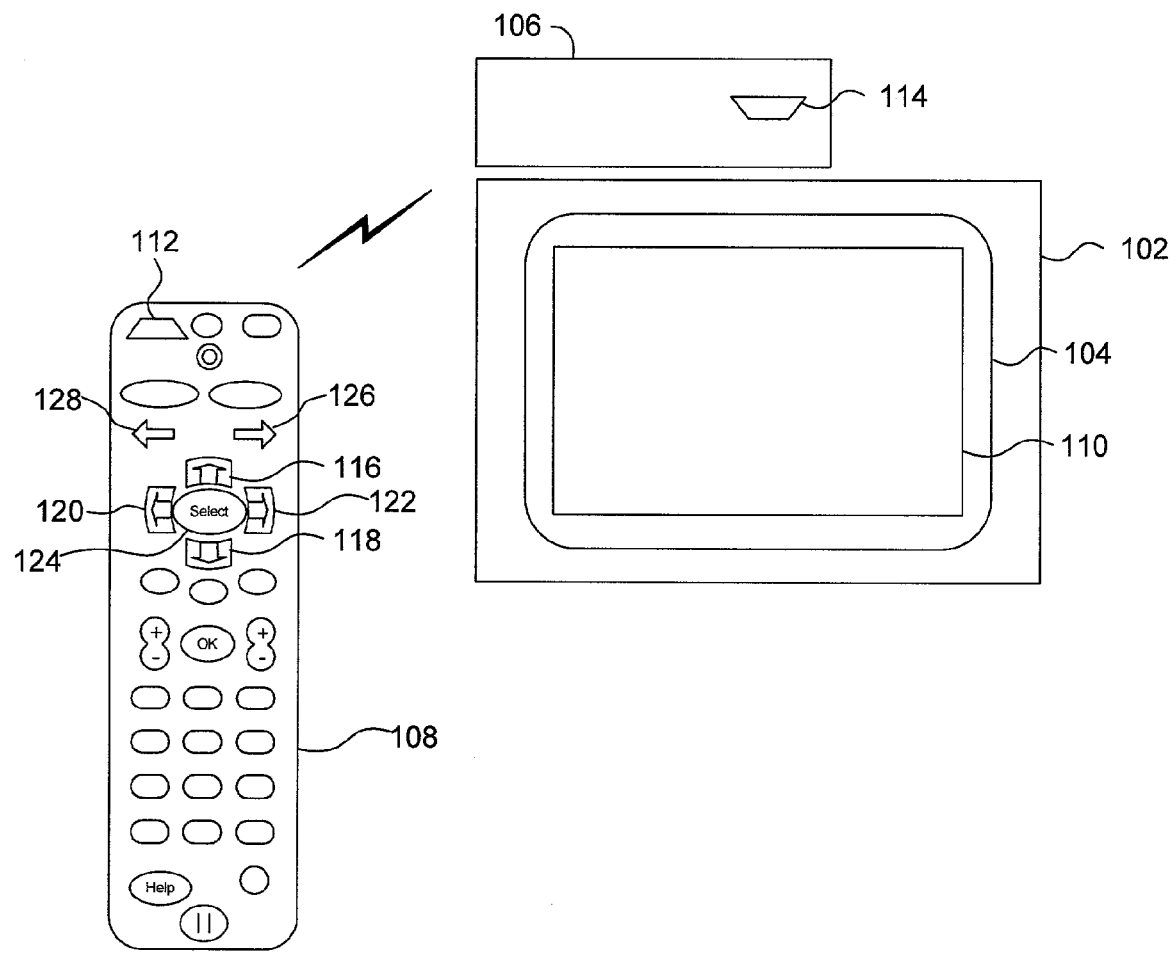
FIG. 1 is a block diagram of an ITV system.

Referring now to FIG. 1, there is shown a block diagram of an ITV system 100 according to an embodiment of the invention. In one configuration, the ITV system 100 includes a television (TV) 102 or other display device having a display screen 104, a set-top box (STB) 106, and a remote control 108.

The STB 106 serves as a gateway between the TV 102 and a broadband communication network (not shown), such as a cable television network or a direct broadcast satellite (DBS) network. One commercially-available example of an STB 106 is the Motorola DCT5000® interactive set-top terminal.

The STB 106 receives encoded television signals and other data from the broadband network and processes the same for display on the display screen 104. The STB 106 may also include hardware and software for presenting a graphical user interface (GUI) 110 on the display screen 104 for operating the various functions and services of the STB 106. In alternative embodiments, the STB 106 may be integrated into the TV 102 or may be embodied within a personal computer (PC), mobile computing device, or the like.

The remote control 108 is provided for convenient remote operation of the STB 106 and the TV 102. The remote control 108 may include a wireless transmitter 112 for transmitting control signals to a wireless receiver 114 within the STB 106 using radio frequency (RF) or infrared (IR) techniques.

In addition, the remote control 108 may include a number of buttons or other similar controls. For instance, the remote control 108 may include an "Up" button 116, a "Down" button 118, a "Left" button 120, a "Right" button 122, and a "Select" button 124. In an embodiment, the remote control 108 may further include a "Forward" button 126 and a "Backward" button 128. Of course, a variety of other buttons or controls may be provided within the scope of the invention. In alternative implementations, the remote control 108 may be embodied as a keyboard, mouse, or other suitable input device.

As noted, an ITV system 100 typically provides access to a plurality of selectable options, such as channels, programs, applications, digital media files, etc. For instance, an ITV system 100 may provide access to literally hundreds of broadcast TV channels, pay-per-view (PPV) channels, music channels, and the like. Additionally, an ITV system 100 may provide access to a number of interactive channels or applications, including web browsers, e-mail programs, chat clients, personal video recorder (PVR) applications, contact directories, and the like. Furthermore, an ITV system 100 may store or provide access to stored PVR recordings, digital photographs, audio (MP3) files, or other forms of digital media.

Figure 2:
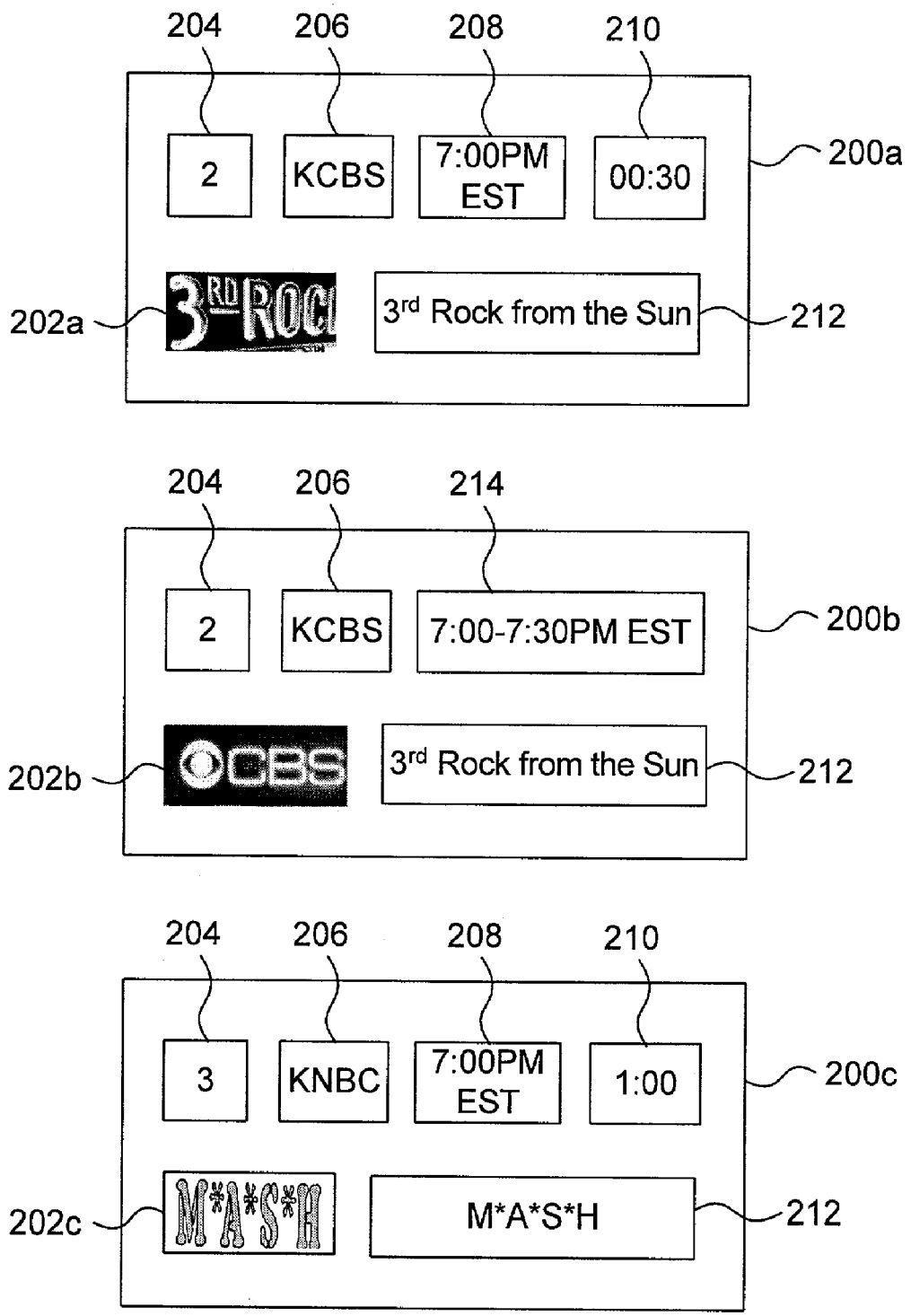
FIG. 2 is an illustration of a plurality of cards.

As shown in FIG. 2, each selectable option within the ITV system 100 may be associated with a card 200. A card 200 is an object or other suitable data structure that provides information about and/or access to an available option within an ITV system 100. A card 200 may be a container of all of the attributes, actions, and/or states needed to facilitate interaction with the option represented thereby. Cards 200 may be stored in any suitable format within a memory or disk drive of the ITV system 100.

Each card 200 may include a graphical representation 202 for display in the GUI 110, as described in detail below. The graphical representation 202 may include various types or combinations of artwork, digital photography, captured video frames, animations, or the like.

As depicted in FIG. 2, cards 200*a–c* may be used to represent television programs or channels. The television programs may be ongoing (live), upcoming, or previously-recorded as of the time of review by a user of cards 200. In addition to a graphical representation 202, such cards 200 may include but not necessarily display, for instance, a channel number 204, a channel name or identifier 206, a starting time 208, a running time 210, and a text description 212. In one embodiment, and as an alternative or in addition to the starting time 208 and running time 210, cards 200 may include a time slot 214. Of course, cards 200 representing other types of options may include additional or different types of information, such as audio/video clips, file or path names, network addresses (URLs), etc.

The graphical representations 202 associated with cards 200 may have different levels of specificity or granularity. For instance, a graphical representation 202*a* may correspond generally to a television series, e.g., "3$^{rd}$ Rock from the Sun," while another graphical representation 202*b* may correspond to a television programming source such as a television station, e.g., "TBS," or network, e.g., "CBS." In other embodiments, a graphical representation 202 may correspond to a specific episode of a television series (e.g., a series premier), or even a product (purchase opportunity) associated with the television program. In still other embodiments, a generic graphical representation 202 may be provided, which may be overlaid by the channel number 204, text description 212, or other information, where a more specific card 200 is not available.

Cards 200 may be generated locally within an ITV system 100 or may be received via the broadband network using HTTP (hypertext transfer protocol), FTP (file transfer protocol), ATVEF (advanced television enhancement forum) triggers or other well-known protocols or techniques. In one embodiment, a card 200 may be received with data encoded in the vertical blanking interval (VBI) of a television signal. Additionally, information associated with cards 200 (e.g., channel number 204, starting time 208, running time 210) may be dynamically updated with information received in ATVEF triggers.

Figure 3:
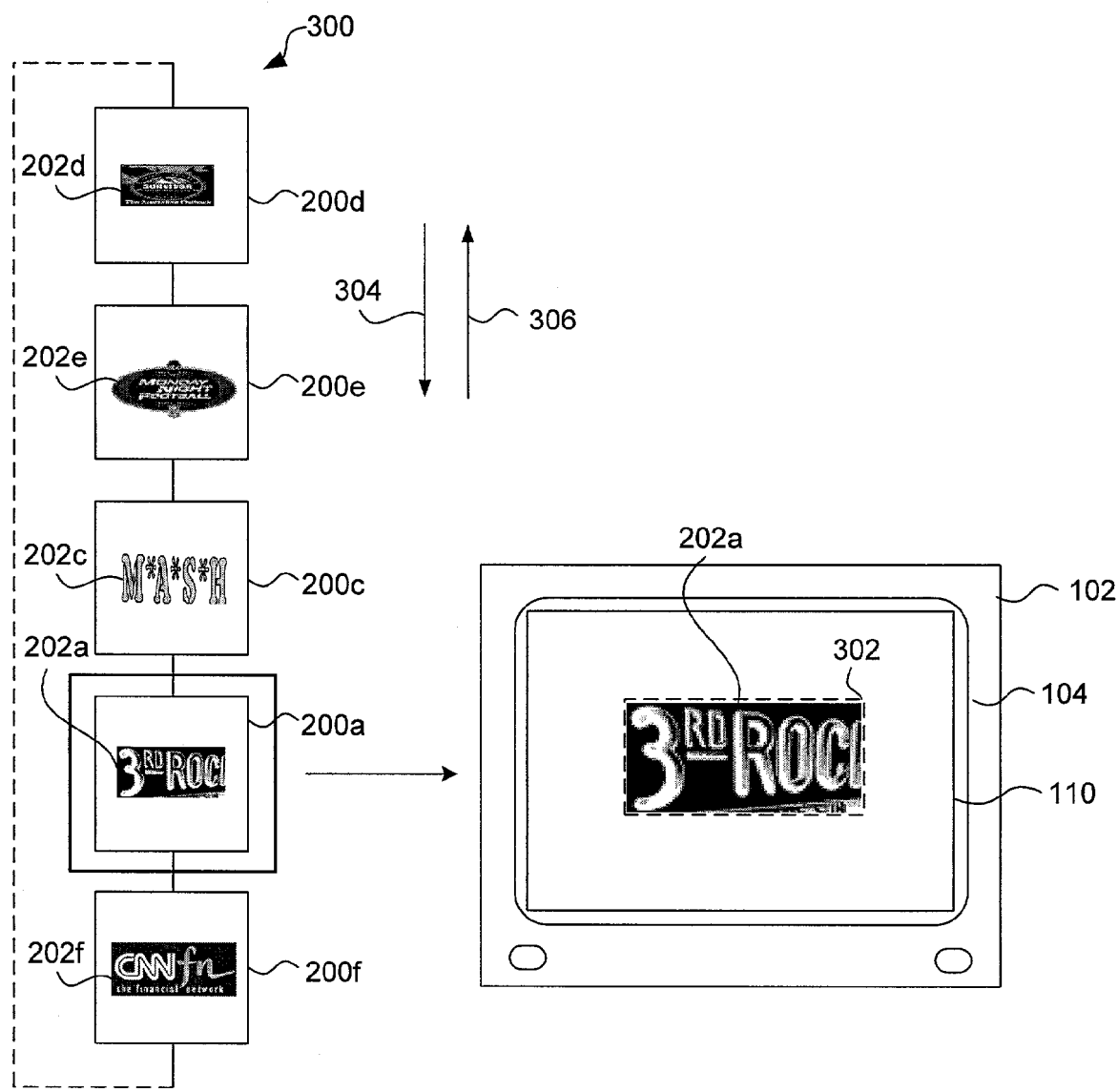
FIGS. 3–11 are illustrations of various techniques for focused navigation of a plurality of options within a user interface.

Referring to FIG. 3, a plurality of cards 200 may be arranged or grouped together in a package or sequence 300. The sequence 300 may be circular (as depicted), linear, or configured in other ways. The sequence 300 may be arranged in numerical order by channel number 204, in alphabetical order by the text description 212, or in other preset or user-defined ways.

In the illustrated embodiment, one card 200*a* in the sequence 300 is active or in "focus." As shown, the active card 200*a* may be displayed within a focus area 302 of a GUI 110 displayed on the TV 102. For brevity, the phrase "displaying a card" refers herein to displaying, or presenting as output to a display device, a graphical representation 202 associated with the card 200. Other information associated with the card, e.g., the channel number 204 or text description 212, may or may not be displayed.

A focus area 302 is a single location of the GUI 110 at which the cards 200 are successively displayed (i.e., displayed one at a time in any direction along a sequence). The focus area 302 may be located at a central or visually dominant location of the GUI 110, although the invention is not limited in this respect. As used herein, the term "focused navigation" refers to a technique of displaying a sequence (e.g., sequence 300) of cards 200 within a focus area 302.

In response to a single user action, the cards 200 in a sequence 300 are successively displayed within the focus area 302. Where the sequence 300 is circular, the successive display of cards 200 may continue indefinitely until halted by the user by a subsequent action, as described more fully below.

The single user action to initiate navigation may be pressing (or pressing and holding down) a button on the remote control 108. For example, the user may press the "Up" button 116 to initiate the successive display in a first direction within the sequence 300 (indicated by line 304), and press the "Down" button 118 to initiate navigation in the opposite direction (indicated by line 306). Alternatively, the user may speak a command into a microphone (either within the STB 106 or remote control 108) to initiate navigation. Alternatively, the STB 106 or remote control 108 may incorporate one or more sensors that allow a user to navigate the cards 200 using bodily gestures. Such or similar sensors may further allow a user to invoke the GUI 110 using bodily gestures. Alternatively, the STB 106 or remote control 108 may incorporate one or more sensors that receive and interpret electromagnetic signals generated by the body of a user in order to navigate the cards 200. Alternatively, the ITV system 100 may be configured such that navigation of cards 200 may be accomplished by touching or otherwise physically contacting the display screen 104. Of course, the user action may be performed in a variety of other ways within the scope of the invention.

In one embodiment, the sequence 300 of cards 200 is successively displayed at a rate selected by the user. For instance, initially pressing the "Up" button 116 may cause the sequence 300 to be displayed at a rate of two cards 200 per second. As the user continues to hold the "Up" button 116, the rate may increase gradually or in steps to any practical rate within the limit of a typical user's ability to recognize individual cards 200 when they are displayed. Many users are able to recognize individual cards 200 at a rate of seven or more cards 200 per second (420 per minute), facilitating rapid navigation of available options.

The cards 200, when displayed within the focus area 302, may be sufficiently large to permit user recognition from a comfortable viewing distance for the particular display screen 104. Thus, unlike PC icons, which typically occupy as little as 1/200 of the display area of the display screen 104, the displayed cards 200 (and the card 200 in the focus area 302 in particular) may occupy between 1/10 and 1/4 of the total display area.

When the user sees displayed a card 200 of a channel or option that she desires to select or view, the user may take some additional action and the successive display of cards 200 is halted. For example, where navigation was initiated by pressing and holding down the "Up" button 116, the user may release the "Up" button 116 to discontinue navigation. In an alternative embodiment, where the successive display was initiated simply by pressing a button, the user may press the same or a different button to halt the successive display. Of course, the user may discontinue navigation in a variety of other ways within the scope of the invention.

If the user's reaction time is fast enough, the card 200 representing the desired channel remains displayed in the focus area 302 once navigation is discontinued. However, the user's reaction time may not be fast enough and one or more cards 200 may be subsequently displayed. In such a case, the user may manually backtrack to the desired card 200 by repeatedly activating a suitable control on the remote control 108. For example, briefly pressing the "Up" or "Down" buttons 116, 118 may result in the previous or next card 200, respectively, being displayed. Alternatively, as described in greater detail below, the ITV system 100 may attempt to determine the delay between the user recognizing the desired card 200 and taking the subsequent action and compensate for that delay by reverting to a previously-displayed card 200.

The user may select the channel or option associated with the displayed card 200 by taking a selection action. For instance, the user may press the "Select" button 124 on the remote control. Alternatively, the selection action may simply be waiting a set amount of time without activating any controls on the remote control 108.

The effect of activating the card 200 will vary depending on the type of card 200. For instance, in the case of a card 200 representing a live television program, the GUI 110 may be replaced by a full-size version of the program. Alternatively, activating a card 200 corresponding to a purchase opportunity may result in the display of a web browser directed to a particular website.

Figure 4:
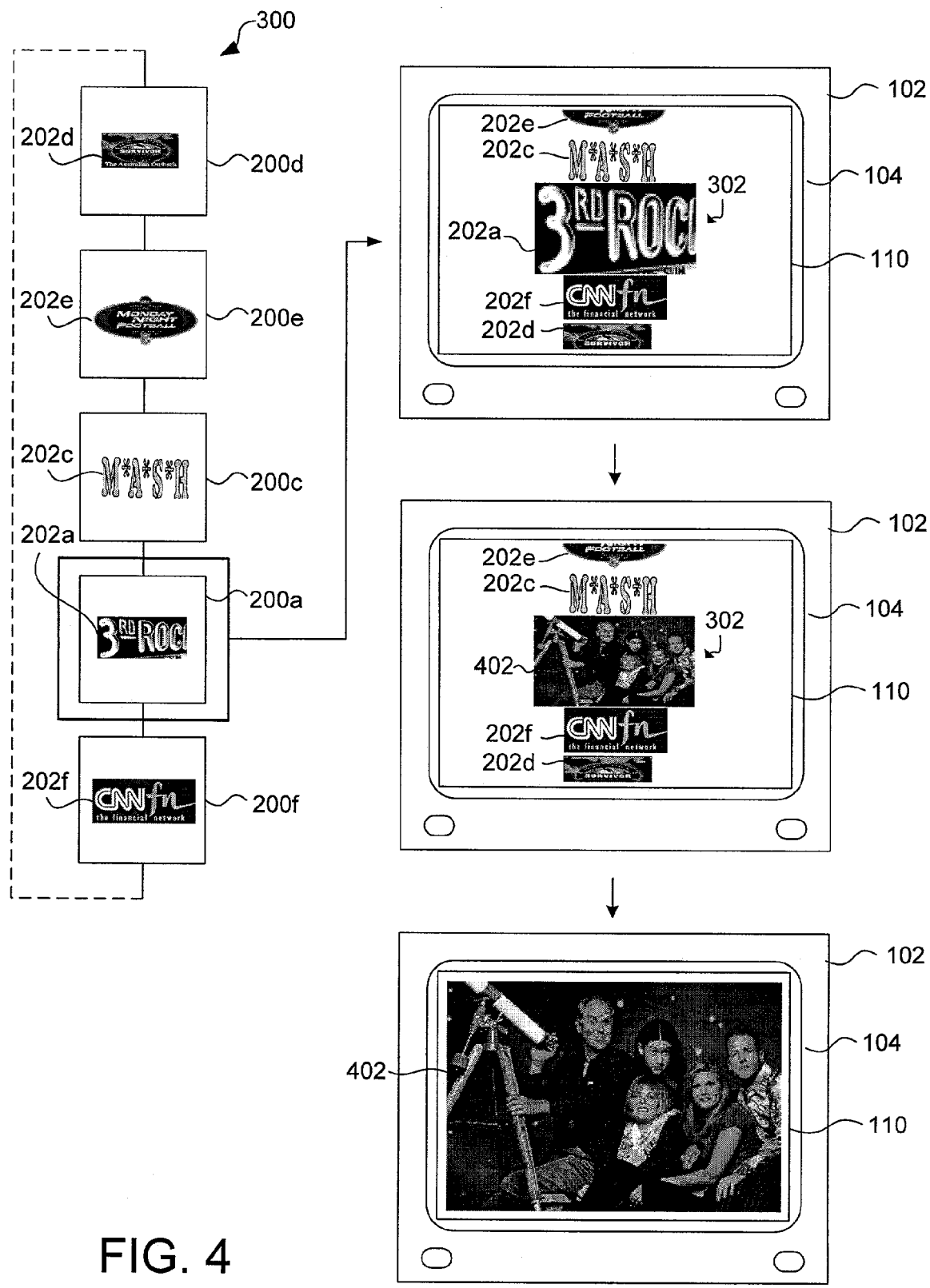

As shown in FIG. 4, one or more previous and next cards 200 within the sequence 300 may be displayed along an axis of the GUI 110 to provide the user with a more complete navigational context within the sequence 300. For example, at least a subset of the sequence 300 of cards 200 may be displayed along a vertical axis, with the active card 200a being displayed in the focus area 302. In alternative embodiments, the cards 200 may be displayed along horizontal or diagonal axes, or in other suitable ways.

Typically, one or more cards 200 in a sequence 300 are not displayed. These off-screen or hidden cards may be dynamically changed, replaced, or updated during navigation, e.g., a card 200 representing an advertisement may change from one sponsor to another.

When a user activates one of the navigation buttons of the remote control 108 (e.g., the "Up" or "Down" buttons 116, 118), the displayed cards 200 in the sequence 300 may appear to shift or cycle downward or upward, respectively, with a new card (e.g., card 200c or 202f) entering the focus area 302. Alternatively, the "Left" or "Right" button 120, 122 may be used for the same purpose.

As depicted, the card 200a in the focus area 302 may be visually emphasized in various ways. For example, the card 200a may be enlarged relative to the other displayed cards 200. Alternatively, the card 200a may be animated, marked, illuminated, highlighted, or otherwise set apart from the other cards 200.

In certain embodiments, if the user allows a card 200 representing a live television program to remain in the focus area 302 for a certain amount of time (e.g., 2 seconds), the card 200a may be overlaid by a video window 402 showing the live television program. Furthermore, if the user continues to linger on the card 200a (or if the user presses the "Select" button 124), the video window 402 may be enlarged 402 to fill the entire display screen 104. Other types of cards 200 may exhibit different types of behaviors when the card 200 remains in the focus area 302 for an established period of time.

Where the cards 200 represent live television programs, a card 200 corresponding to the currently-tuned channel (at the current date and time) may be selected by default for display in the focus area 302 each time the GUI 110 is shown. This may occur, for instance, when the user is watching TV and presses a button (such as the "Select" button 124) in order to display the GUI 110. Additionally, an indication of the currently-displayed card 200 in the focus area 302 may be stored in non-volatile memory or otherwise maintained such that if a reset condition occurs (e.g., the STB 106 is rebooted or reset after a power loss, etc.) the last-displayed card 200 may be restored to the focus area 302.

Figure 5:
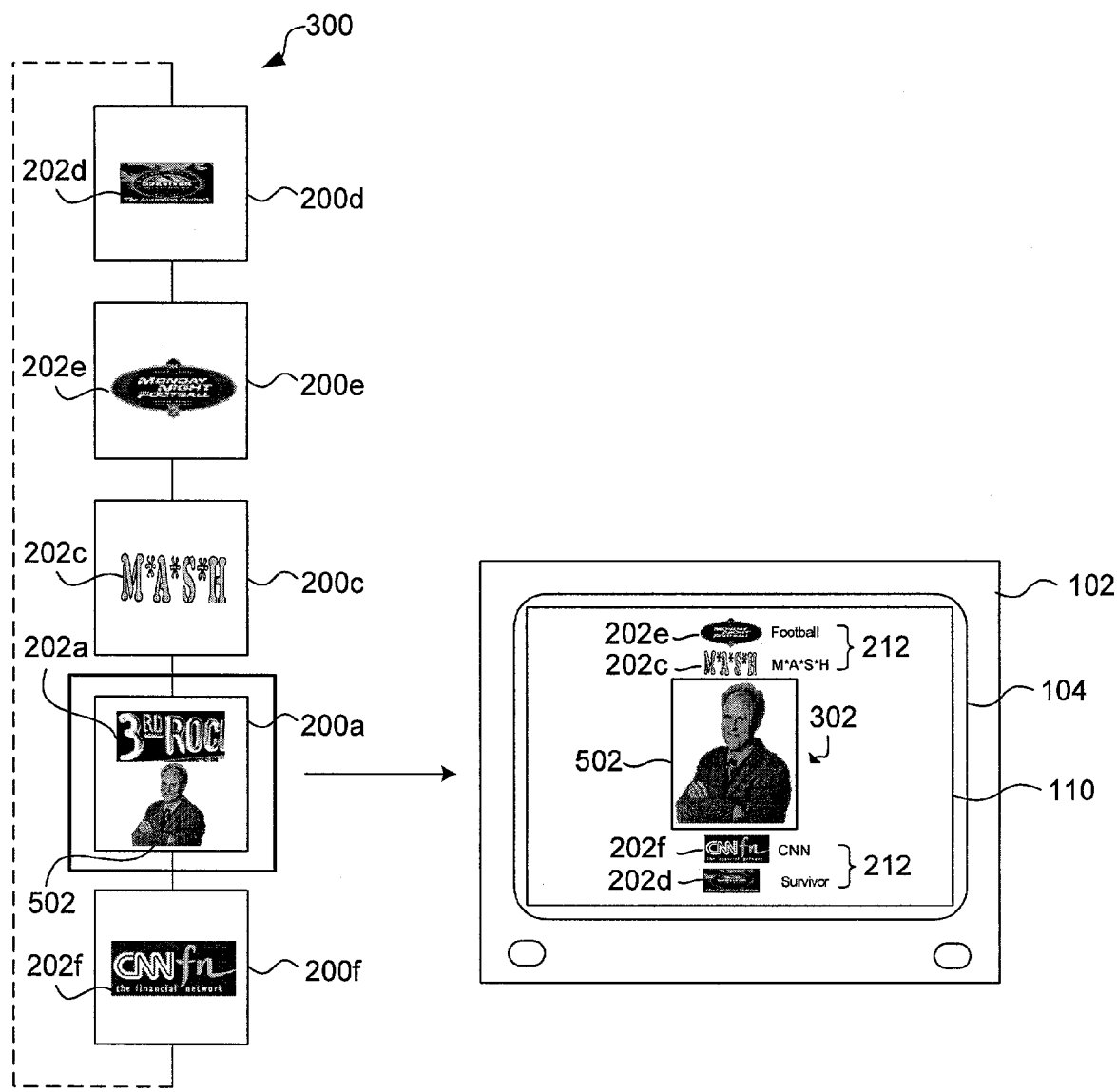

As shown in FIG. 5, cards 200 may include one or more alternative graphical representations 502, which may be displayed when the card 200 enters the focus area 302. As depicted, cards 200c–f displayed outside of the focus area 302 are shown using a first graphical representation 202c–f. However, when the card 200a enters the focus area 302, the alternative graphical representation 502 is shown. Additionally, cards 200 outside of the focus area 302 may be displayed in a reduced-size format with text descriptions 212.

Figure 6:
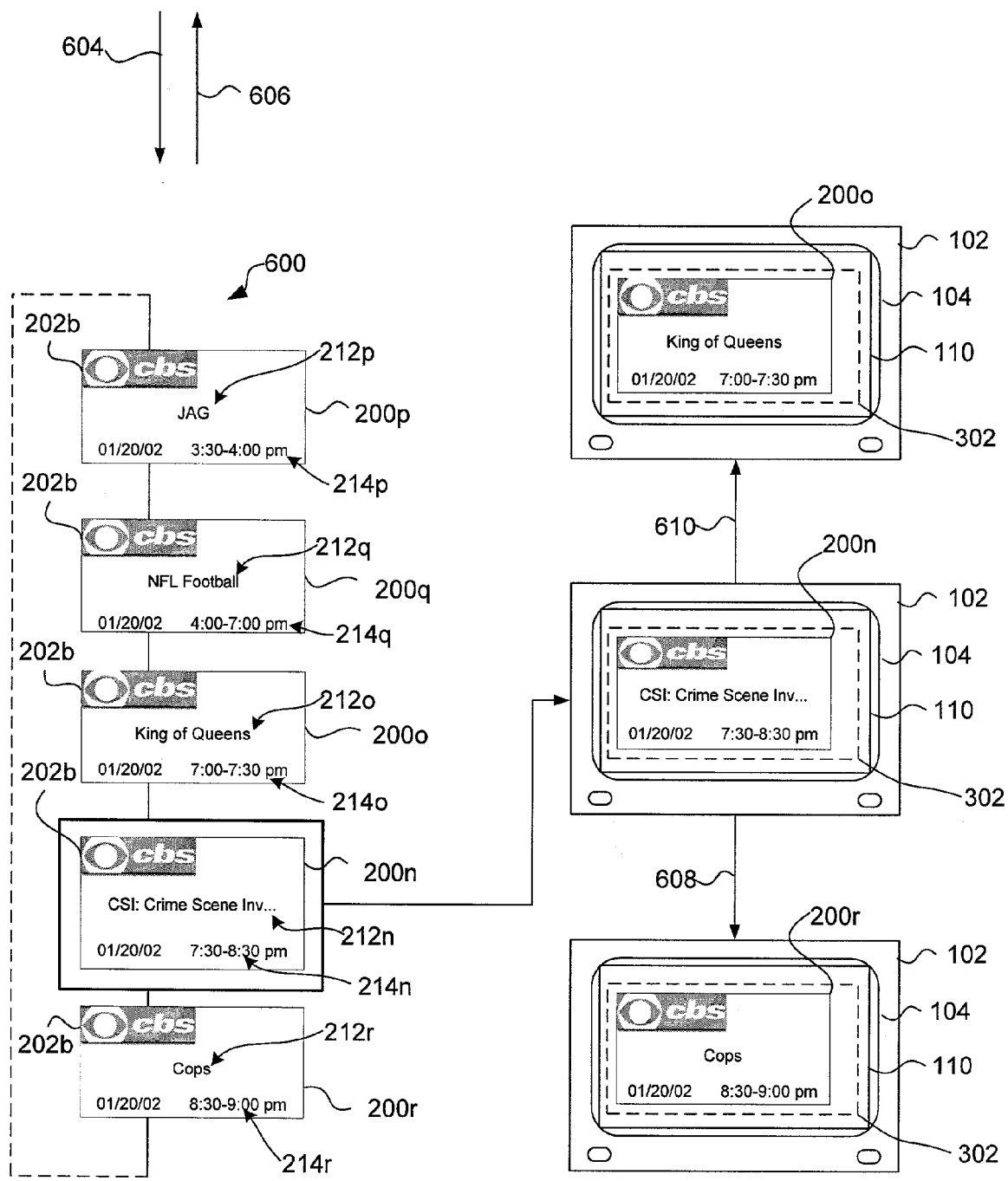

Referring to FIG. 6, a plurality of cards 200 may be arranged or grouped together in a package or sequence 600. In the illustrated embodiment, the cards 200n–r in the sequence 600 represent a single television network (e.g., CBS), as indicated by the graphical representation 202b. The cards 200n–r in the sequence 600 further represent the television programs, as indicated by the text descriptions 212n–r, carried by the represented television network. In an alternative embodiment, the graphical representation 202b depicting the television network represented by cards 200 may be replaced by or supplemented with a graphical representation 202 of the represented television programs.

The sequence 600 may be circular (as depicted), linear, or configured in other ways. In the illustrated embodiment, the sequence 600 is arranged in chronological order by time slot

214. Although, as illustrated, the time slots 214 associated with the sequence 600 range from 3:30 pm to 9:00 pm on a single day (e.g., Jan. 20, 2002), such a chronological range can be expanded or contracted in accordance with preset or user-defined criteria and to the greatest extent practicable.

In the illustrated embodiment, one card 200*n* in the sequence 600 is active or in "focus." In an embodiment, the card 200 associated with the time slot 214 corresponding to the current time (i.e., the card 200 representing live programming as the user addresses the sequence 600) is, as a default condition, in focus. As shown, the active card 200*n* may be displayed within a focus area 302 of a GUI 110 displayed on the TV 102. Other information associated with the card (e.g., the channel number 204 or text description 212) may or may not be displayed.

In response to one or more user actions, the cards 200 in the sequence 600 are successively displayed within the focus area 302. Where the sequence 600 is circular, the successive display of cards 200 may continue indefinitely until halted by a subsequent action by the user, as described more fully herein.

The user action to initiate navigation may be pressing and releasing (or pressing and holding down) a button on the remote control 108. For example, the user may press the "Forward" button 126 repeatedly to effectuate a corresponding card-by-card (i.e., program-by-program) navigation of sequence 600 in a first direction (indicated by arrow 604). In the illustrated embodiment of FIG. 6, pressing the "Forward" button 126 once will, as indicated by arrow 608, supplant within the focus area 302 the card 200*n* with card 200*r* representing a later time slot 214*r*. The user may likewise press the "Backward" button 128 repeatedly to effectuate a corresponding card-by-card navigation of sequence 600 in a second direction (indicated by arrow 606). In the illustrated embodiment of FIG. 6, pressing the "Backward" button 128 once will, as indicated by arrow 610, supplant within the focus area 302 the card 200*n* with card 200*o* representing an earlier time slot 214*o*.

In an embodiment, navigation of sequence 600 may be by preset or user-defined time slot increments (e.g., 30 minutes, 60 minutes, etc.), rather than the program-by-program navigation discussed above. In addition, any one visual feature or combination of visual features (e.g., text description 212, graphical representation 202, time slot 214) of cards 200 may change color or otherwise visually convey a different time slot state in response to navigation among cards 200. For example, the text associated with cards 200 representing earlier time slots may be in red, text of cards 200 representing current time slots may be in green, and text of cards 200 representing later time slots may be in blue. Of course, audible state indicators may also be used to provide time slot state information in response to navigation among cards 200.

In an alternative embodiment, the user may press the "Forward" button 126 to initiate a continual successive display in the first direction within the sequence 600 (indicated by arrow 604), and press the "Backward" button 128 to initiate a continual successive display in the opposite direction (indicated by arrow 606). Alternatively, the user may speak a command into a microphone (either within the STB 106 or remote control 108) to initiate navigation. Of course, the user may initiate navigation in a variety of other ways within the scope of the invention.

In one embodiment, the sequence 600 of cards 200 is successively displayed at a rate selected by the user in the manner described above in connection with sequence 300.

When the user sees displayed a card 200 representing a time slot 214 and/or programming that she desires to select or view, the user may take some additional action to halt the successive display of cards 200. For example, where navigation was initiated by pressing and holding down the "Forward" button 126, the user may release the "Forward" button 126 to discontinue navigation. In an alternative embodiment, where the successive display was initiated simply by pressing a button, the user may press the same or a different button to halt the successive display. Of course, the user may discontinue navigation in a variety of other ways within the scope of the invention.

If the user's reaction time is fast enough, the card 200 representing the desired channel remains displayed in the focus area 302 once navigation is discontinued. However, the user's reaction time may not be fast enough and one or more cards 200 may be subsequently displayed. In such a case, the user may manually backtrack to the desired card 200 by repeatedly activating a suitable control on the remote control 108. For example, briefly pressing the "Forward" or "Backward" buttons 126, 128 may result in the previous or next card 200, respectively, being displayed. Alternatively, as described in greater detail below, the ITV system 100 may determine the delay between the user recognizing the desired card 200 and taking the subsequent action, whereupon the ITV system 100 may compensate for that delay by reverting to a previously-displayed card 200.

The user may select or activate the programming associated with the displayed card 200 by taking a selection action. For instance, the user may press the "Select" button 124 on the remote control. Alternatively, the selection action may simply be waiting a set amount of time without activating any controls on the remote control 108.

The effect of activating the card 200 will vary depending on the time slot associated with the activated card 200. For instance, if at 7:45 pm on Jan. 20, 2002 card 200*n* (representing, at such time, a live television program) is selected, the GUI 110 may be replaced by a full-size version of the program described by text description 212*n*. Alternatively, if at 7:45 pm on Jan. 20, 2002 card 200*r* (representing, at such time, a television program to be broadcast in a later time slot by the represented network) is selected, the user may, via the GUI 110 or otherwise, be offered the opportunity to record, by a personal video recorder or other recording means, the program described by text description 212*r*. Alternatively, if at 7:45 pm on Jan. 20, 2002 card 200*o* (representing, at such time, a television program broadcast in an earlier time by the represented network) is selected, the user may, via the GUI 110 or otherwise, be offered the opportunity to view a recorded or otherwise stored version of the program described by text description 212*o*.

Figure 7:
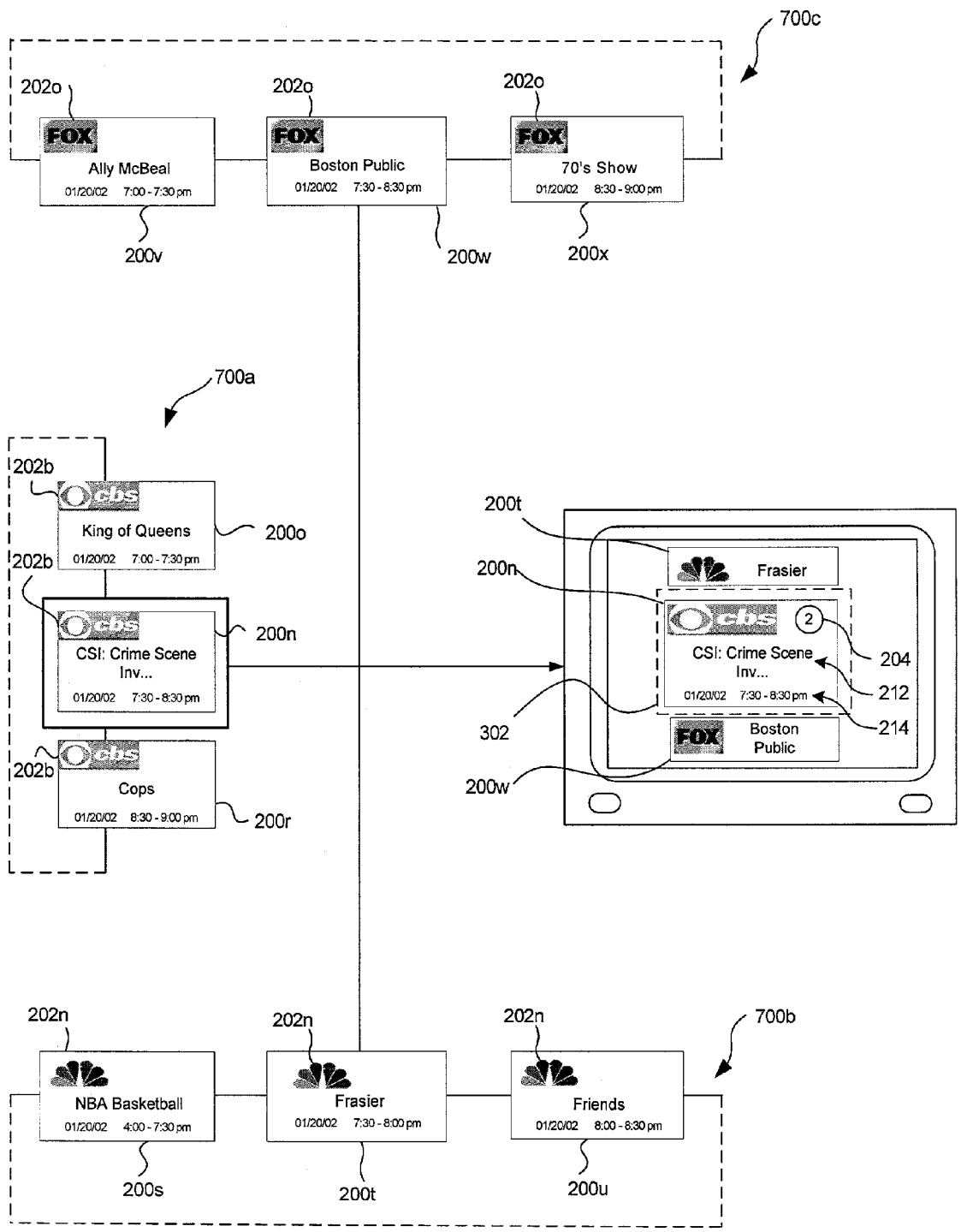

As shown in FIG. 7, multiple sequences 700*a–c* of cards 200 may be displayed simultaneously within the GUI 110. For instance, one or more cards 200*n*, 200*o*, 200*r* from a sequence 700*a* representing both a first television network and the television programs carried by the first television network may be displayed as described in reference to FIG. 6. In addition, one or more cards 200*s–u* from a sequence 700*b* representing both a second television network and the television programs carried by the second television network may be displayed in a corresponding region (e.g., above the focus area 302) of the GUI 110. In addition, one or more cards 200*v–x* from a sequence 700*c* representing both a third television network and the television programs carried by the third television network may be displayed in a corresponding region (e.g., below the focus area 302) of the GUI 110. Each of the sequences 700*a–c* and their respective cards 200 may function, be structured and/or interrelate in a manner identical to that of sequence 600 and its cards 200 described above. As shown in FIG. 7, a card 200 (in the illustrated example, card 200n) displayed in the focus area 302 may expand, in terms of spatial dimension and/or displayed information, to show, in addition to the text description 212, its associated channel number 204 and time slot 214 or any of the other card attributes previously discussed. Of course, more or fewer sequences 700 may be simultaneously displayed as is practicable. Additionally, the character of the graphical representations 202 associated with simultaneously-displayed cards 200 need not be homogeneous. For example, the graphical representation 202 of a card 200 displayed in the focus area 302 may depict a network, while the graphical representations 202 of a card or cards 200 displayed outside of the focus area 302 may depict a television program (and vice versa).

Figure 7A:
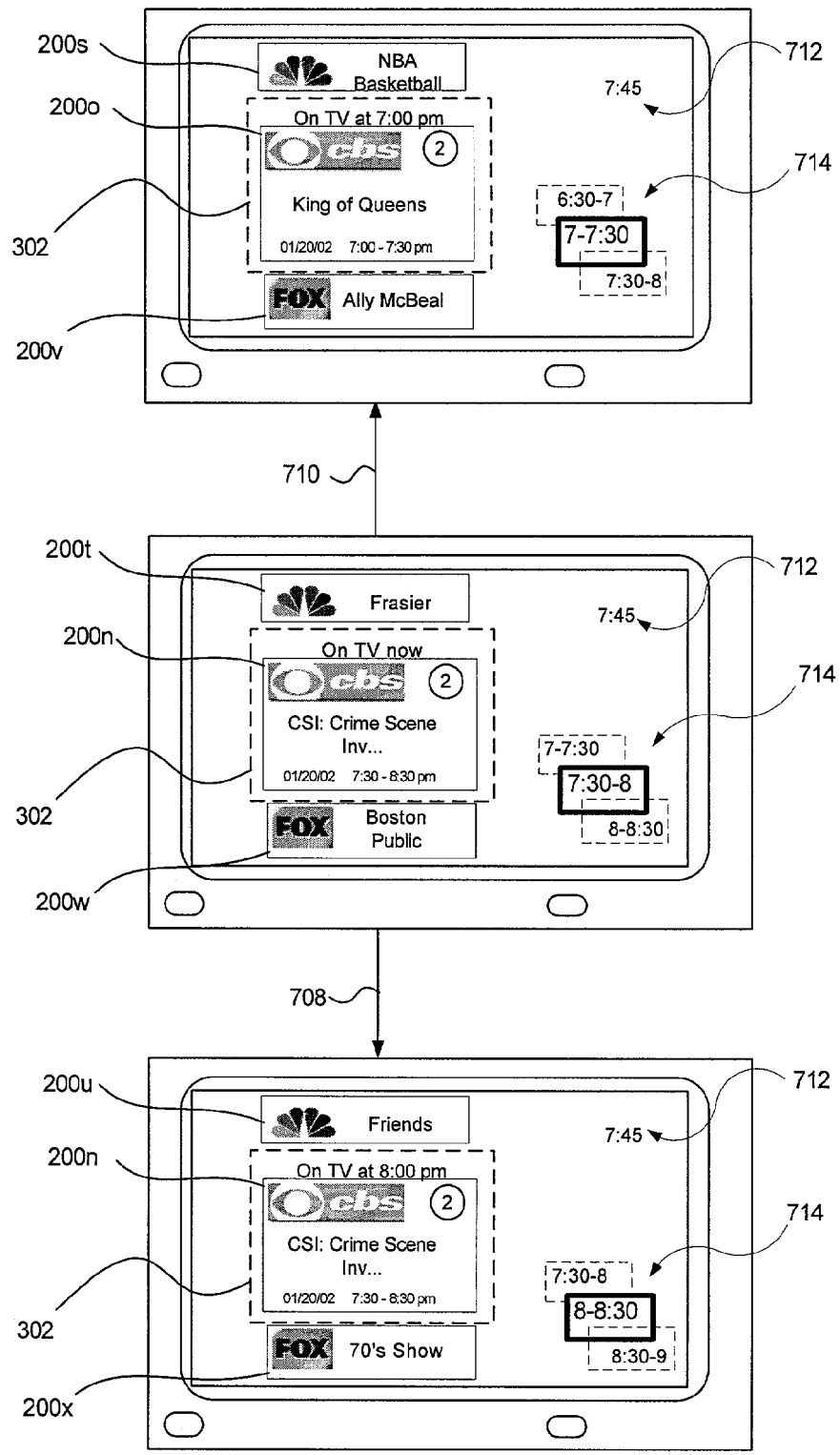

As shown in the embodiment illustrated in FIG. 7A, in response to one or more user actions, the cards 200o, 200n, 200r in the sequence 700a can be successively displayed within the focus area 302 in a manner identical to that of sequence 600 and its cards 200 described above. The cards 200s–u in the sequence 700b and cards 200v–x in the sequence 700c can be simultaneously successively displayed in order to better inform the user of available viewing options.

For example, at 7:45 pm (as may be indicated by a clock 712 displayed on display screen 104) on Jan. 20, 2002 each of cards 200n, 200t, 200w represent live television programming respectively carried by the represented television networks. Accordingly, at the exemplary 7:45 pm time, card 200n, for example, is displayed in the focus area 302, along with cards 200t, 200w which are displayed outside of the focus area 302, in order to show the user the available television programming in a 7:30–8:00 pm time slot. In an embodiment, the GUI 110 may include an animated time slot indicator 714 that, in the illustrated example, outlines in boldface the time slot associated with the displayed cards, as well as outlining in phantom the preceding and succeeding contiguous time slots. Of course, other formats, such as a simulated analog clock, may be used for indicator 714 in order to provide programming schedule context to the user.

The user may press, for example, the "Forward" button 126 (as indicated by arrow 708) to simultaneously advance sequences 700a–c ahead 30 minutes, for example, to an 8:00–8:30 pm time slot. Such navigation enables the user to view available future programming represented by, in the example of FIGS. 7 and 7A, cards 200n, 200u, 200x representing television programming respectively carried by the represented television networks in the 8:00–8:30 pm time slot. The user may likewise press, for example, the "Backward" button 128 (as indicated by arrow 710) to simultaneously advance sequences 700a–c back 30 minutes, for example, to a 7:00–7:30 pm time slot. Such navigation enables the user to view potentially-available previous programming represented by, in the example of FIGS. 7 and 7A, cards 200o, 200s, 200v representing television programming respectively carried by the represented television networks in the 7:00–7:30 pm time slot.

Figure 7B:
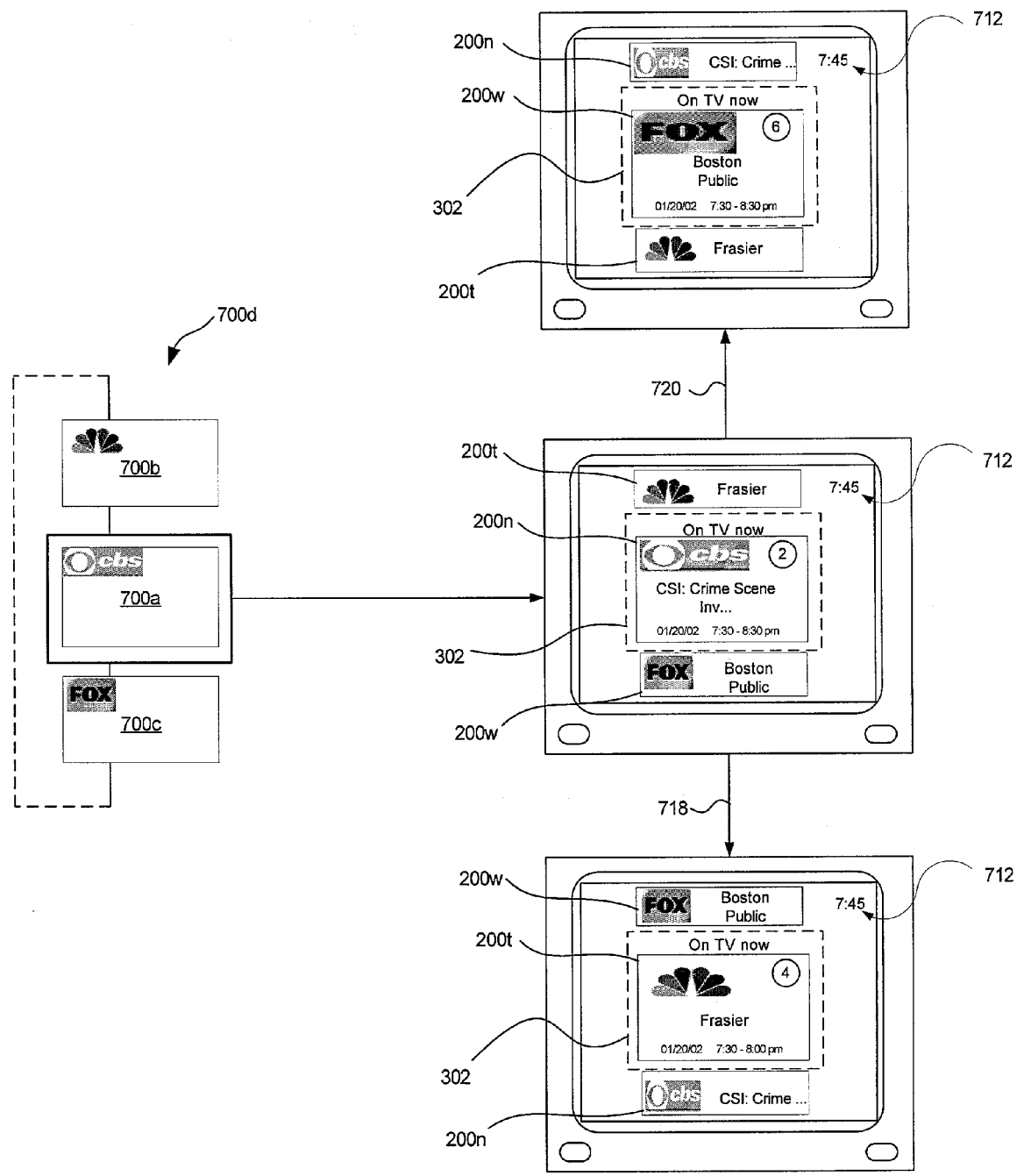

As shown in the embodiment illustrated in FIG. 7B, in response to one or more user actions, cards 200 of the sequences 700a–c can be successively displayed within the focus area 302. Accordingly, the sequences 700a–c may be regarded as being navigable in a sequence 700d. The cards 200 of the sequences 700a–c in any past, present or future time slot can be navigated in order to allow the user to choose from the available viewing options.

For example, at 7:45 pm (as may be indicated by a clock 712 displayed on display screen 104) on Jan. 20, 2002 each of cards 200n, 200t, 200w represent live television programming respectively carried by the represented television networks. Accordingly, at the exemplary 7:45 pm time, card 200n is displayed in the focus area 302, along with cards 200t, 200w which are displayed outside of the focus area 302, in order to show the user the available television programming in a 7:30–8:00 pm time slot. As indicated by arrow 720, the user may press, for example, the "Up" button 116 to move card 200w into the focus area 302, thereby moving card 200n into a region above, for example, the focus area 302. Such navigation enables the user to select card 200w. As indicated by arrow 718, the user may likewise press, for example, the "Down" button 118 to move card 200t into the focus area 302, thereby moving card 200n into a region below, for example, the focus area 302. Such navigation enables the user to select card 200t.

As is similarly the case with sequence 600, if a card 200 representing a live television program is selected from any of sequences 700a–c, the GUI 110 may be replaced by a full-size version of the program described by the corresponding text description 212. Alternatively, if a card 200 representing a television program to be broadcast at a future time is selected from any of sequences 700a–c, the user may, via the GUI 110 or otherwise, be offered the opportunity to record, by a personal video recorder or other recording means, the program described by the corresponding text description 212. Alternatively, if a card 200 representing a television program broadcast at an earlier time is selected from any of sequences 700a–c, the user may, via the GUI 110 or otherwise, be offered the opportunity to view a recorded or otherwise stored version of the program described by the corresponding text description 212.

Figure 8:
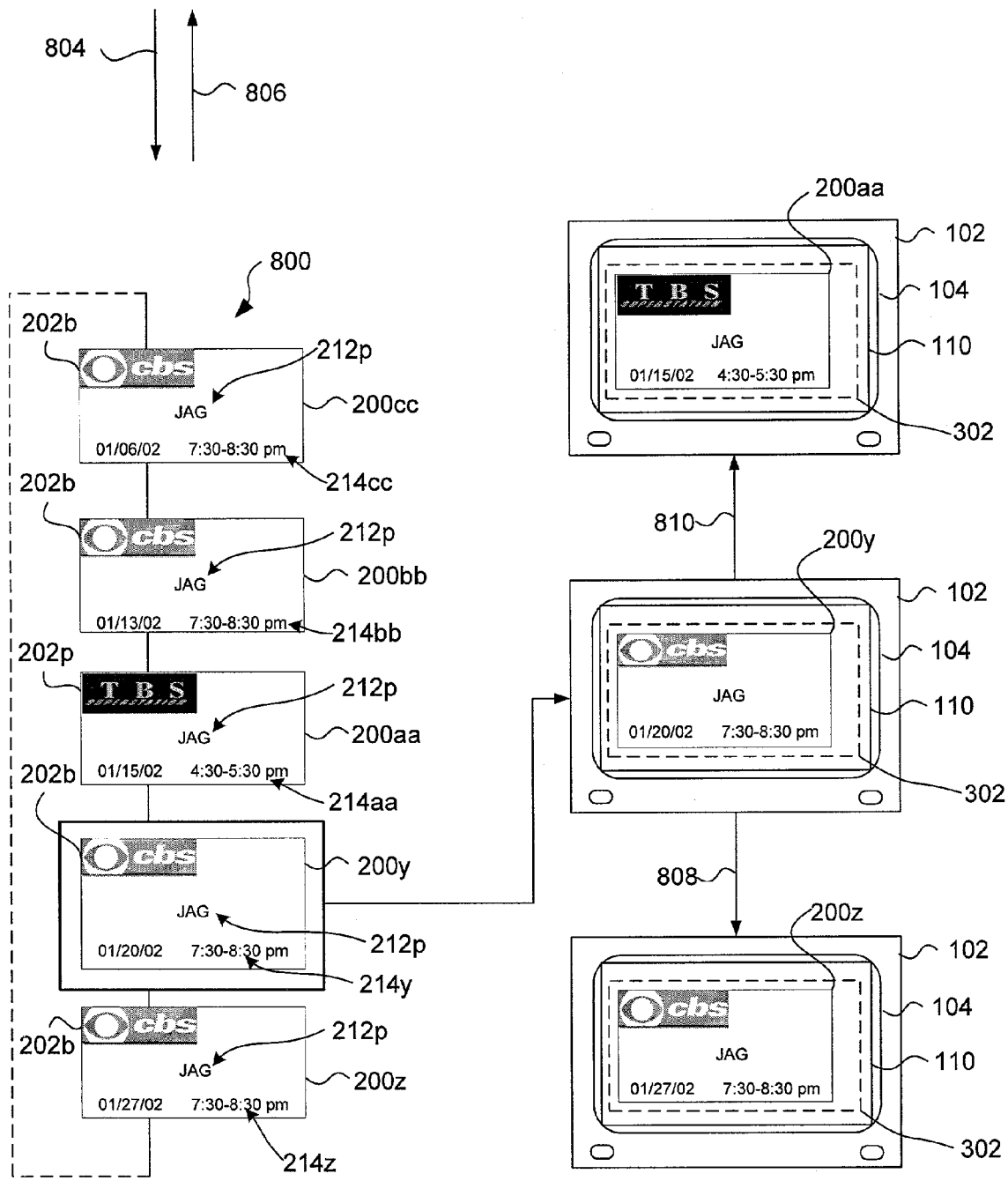

Referring to FIG. 8, a plurality of cards 200 may be arranged or grouped together in a package or sequence 800. In the illustrated embodiment, the cards 200y, 200z, 200aa, 200bb, 200cc in the sequence 800 represent a single television program (e.g., "JAG"), as indicated by the text description 212p, and the television network/station, as indicated by the graphical representations 202b, 202p carrying the television program. In an alternative embodiment, the graphical representation 202b, 202p depicting the television network/station represented by cards 200 may be replaced by or supplemented with a graphical representation 202 of the represented television program. The sequence 800 may be generated, for example, through a search capability associated with ITV system 100 in response to a user-initiated search for a selection of instances in which the particular television program is broadcast. Such a selection of which sequence 800 is comprised may include solely or any combination of previously-, currently-, or to-be-broadcast episodes of the television program.

In response to one or more user actions, the cards 200 in the sequence 800 are successively displayed within the focus area 302. Where the sequence 800 is circular, the successive display of cards 200 may continue indefinitely until halted by a subsequent action by the user, as described more fully herein.

The user action to initiate navigation may be pressing and releasing (or pressing and holding down) a button on the remote control 108. For example, the user may press the "Forward" button 126 repeatedly to effectuate a corresponding card-by-card (i.e., episode-by-episode) navigation of sequence 800 in a first direction (indicated by arrow 804). In the illustrated embodiment of FIG. 8, pressing the "Forward" button 126 once will, as indicated by arrow 808, supplant within the focus area 302 the card 200y with card 200z representing a later time slot 214z, which may represent the next instance of a future broadcast of the television program. The user may likewise press the "Backward" button 128 repeatedly to effectuate a corresponding card-by-card navigation of sequence 800 in a second direction (indicated by arrow 806). In the illustrated embodiment of FIG. 8, pressing the "Backward" button 128 once will, as indicated by arrow 810, supplant within the focus area 302 the card 200y with card 200aa representing an earlier time slot 214o, which may represent the most recent instance of a previous broadcast of the television program. Of course, as is the case with the sequences discussed above with reference to FIGS. 7–7B, sequence 800 may be simultaneously displayed with other sequences of cards 200 within GUI 110.

As is similarly the case with sequence 600, if a card 200 representing a live television program is selected from sequence 800, the GUI 110 may be replaced by a full-size version of the program described by the corresponding text description 212. Alternatively, if a card 200 representing a television program to be broadcast at a future time is selected from sequence 800, the user may, via the GUI 110 or otherwise, be offered the opportunity to record, by a personal video recorder or other recording means, the program described by the corresponding text description 212. Alternatively, if a card 200 representing a television program broadcast at an earlier time is selected from sequence 800, the user may, via the GUI 110 or otherwise, be offered the opportunity to view a recorded or otherwise stored version of the program described by the corresponding text description 212.

Figure 9:
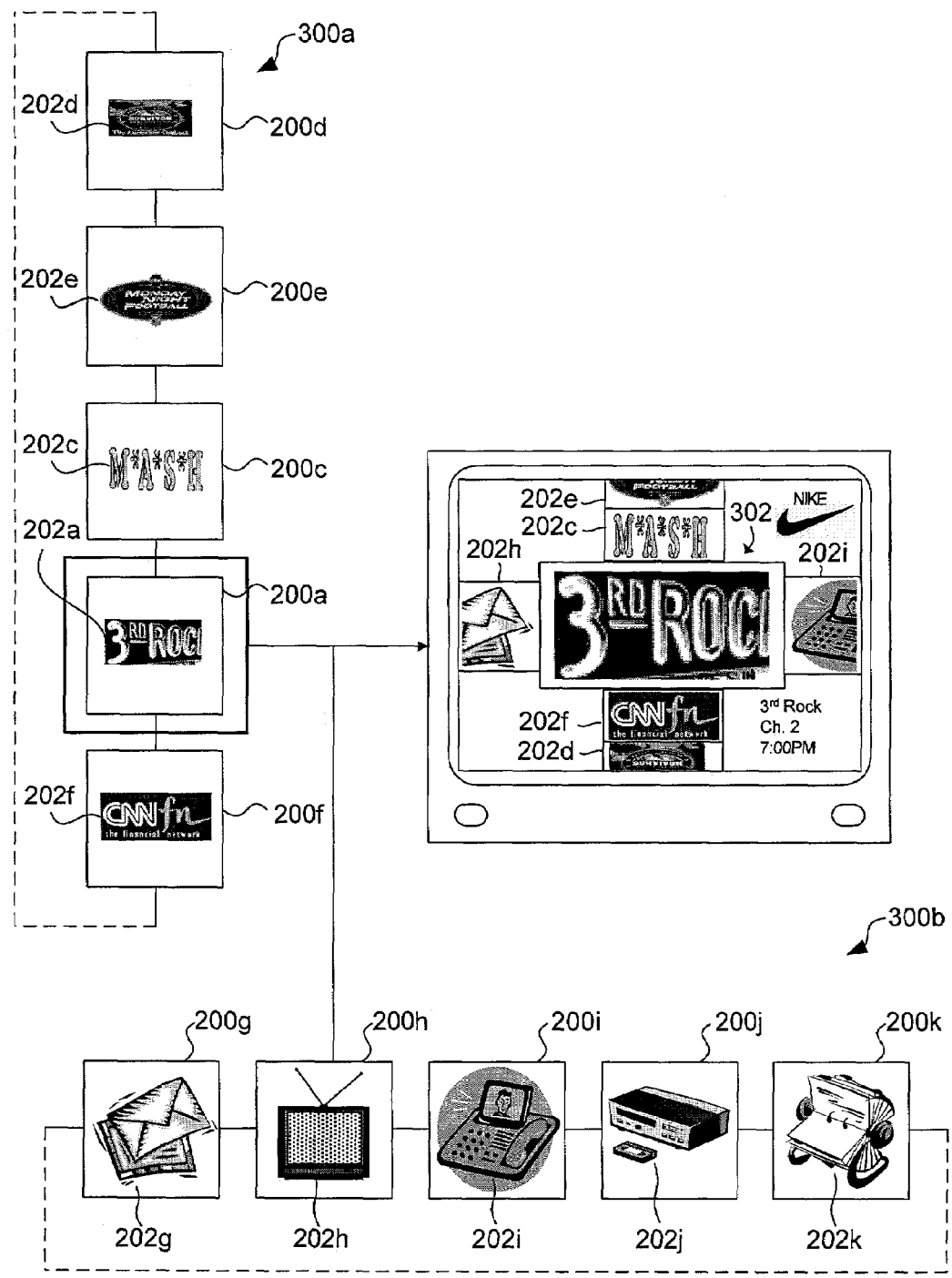

As shown in FIG. 9, multiple sequences 300a–b including different types of cards 200 may be displayed simultaneously. For instance, one or more cards 200 from a sequence 300a representing television programs, networks and/or time slots may be displayed as described herein. In addition, one or more cards 200 from a sequence 300b representing interactive channels, applications, or digital media, may also be displayed.

As illustrated, the second sequence 300b may be displayed horizontally, perpendicular to the first sequence 300a, such that the sequences 300a–b intersect at (and define) the focus area 302. Any number of sequences may be displayed on the GUI 110 simultaneously. Of course, the selection of vertical and horizontal for the sequences 300a–b is merely exemplary and not required.

In the depicted embodiment, the "Up" and "Down" buttons 116, 118 may be used to shift or cycle the vertically-displayed sequence 300a within the GUI 110 in order to bring one of the corresponding cards 200a–e into the focus area 302. Likewise, the "Left" and "Right" buttons 120, 122 may be used to shift or cycle the horizontally-displayed sequence 300b to bring one of the corresponding cards 200g–k into the focus area 302.

In one implementation, bringing a card 200 from one sequence 300 into the focus area 302 will determine or change which other sequence 300 is displayed. For example, bringing the card 200h (TV representation) from the horizontal sequence 300b into focus may result in the vertical sequence 300a (television programs) being displayed. Alternatively, bringing the card 200g (envelope representation) into focus may result in a vertical sequence 300 (not shown) corresponding to e-mail messages or contacts. Likewise, bringing the card 200i (videophone representation) into focus may result in a vertical sequence 300 of a videoconferencing buddy list, while the card 200j (VCR representation) may display a vertical sequence 300 of television programs recorded by a PVR. In alternative embodiments, a selection from a vertical sequence 300 may affect which horizontal sequence 300 is displayed.

Figure 10:
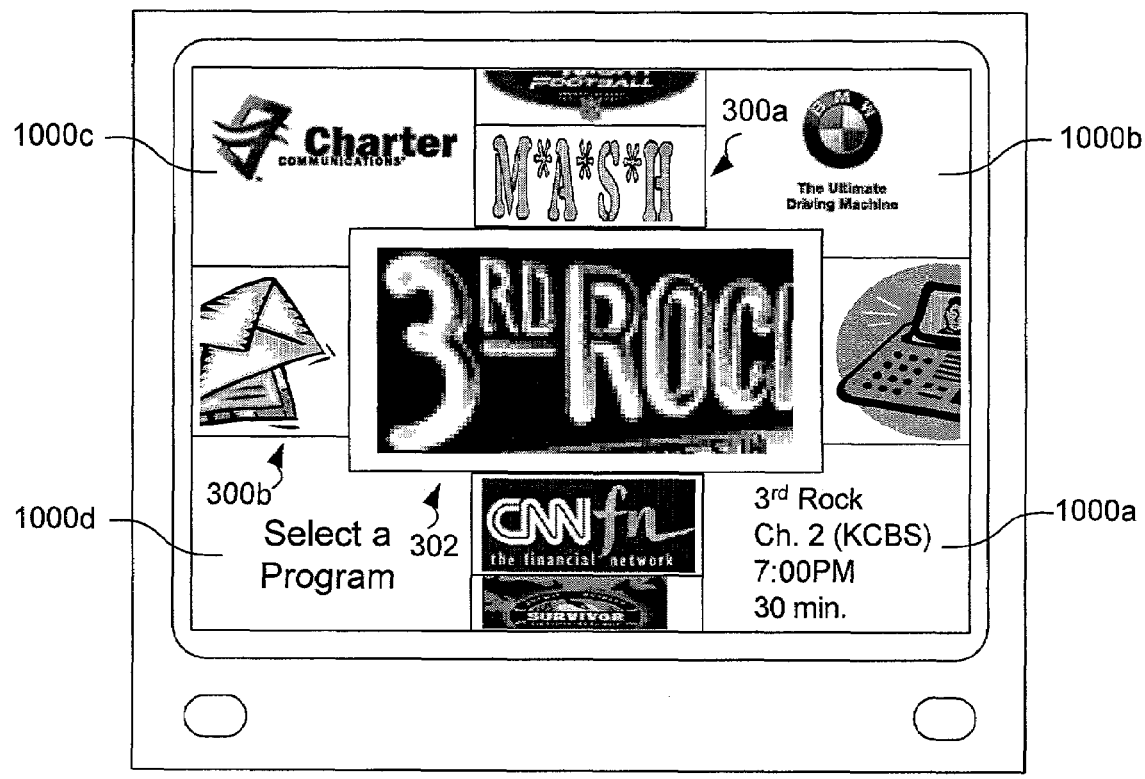

As shown in FIG. 10, the intersection of two displayed sequences 300a–b may generate quadrants 1000 that may be used for various purposes. In one embodiment, the quadrants 1000 are context-sensitive regions that display supplemental information, advertising, or the like, depending on the card 200 in the focus area 302. In other embodiments, one or more quadrants 1000 may display information targeted to the user based on user profile information within the ITV system 100.

In the depicted embodiment, the lower right quadrant 1000a may contain detailed information about the card 200 being displayed in the focus area 302. In the case of a card 200 representing a television program, the quadrant 1000a may display information taken from the channel number 204, channel name or identifier 206, starting time 208, running time 210, and/or text description 212 associated with the card 200.

The upper right quadrant 1000b may include context-sensitive, context-insensitive, or user-targeted information. For example, in an episode of "$3^{rd}$ Rock from the Sun" featuring Dick Solomon driving a new BMW, a corresponding advertisement may be shown. The advertisement may be displayed in response to receipt of an ATVEF trigger, although other mechanisms may be used within the scope of the invention.

The upper left quadrant 1000c may be used for branding purposes. For instance, as shown in FIG. 10, the quadrant 1000c may show a logo for a cable or satellite provider associated with the ITV system 100. In certain implementations, the quadrant 1000c may be context-sensitive, displaying branding corresponding to the particular vertical and/or horizontal sequences 300a–b or cards 200 being displayed.

Finally, the lower left quadrant 1000d may be used to display system notes and instructional text. For example, where the user is navigating a sequence 300a of cards 200 corresponding to television programs, instructional text may be provided that prompts the user to select a television program.

The size of the quadrants 1000 may vary depending, for instance, on the location of the intersection of the displayed sequences 300a–b. If the intersection is near the center of the GUI 110, the quadrants may be equal in size; otherwise, the relative sizes of the quadrants 1000 may vary.

In alternative embodiments, a single vertical or horizontal sequence 300a–b may result in the creation of hemispheres (not shown) rather than quadrants 1000. In still other embodiments, multiple vertical or horizontal sequences 300a–b may result in the creation of any number of context-sensitive regions.

Figure 11:
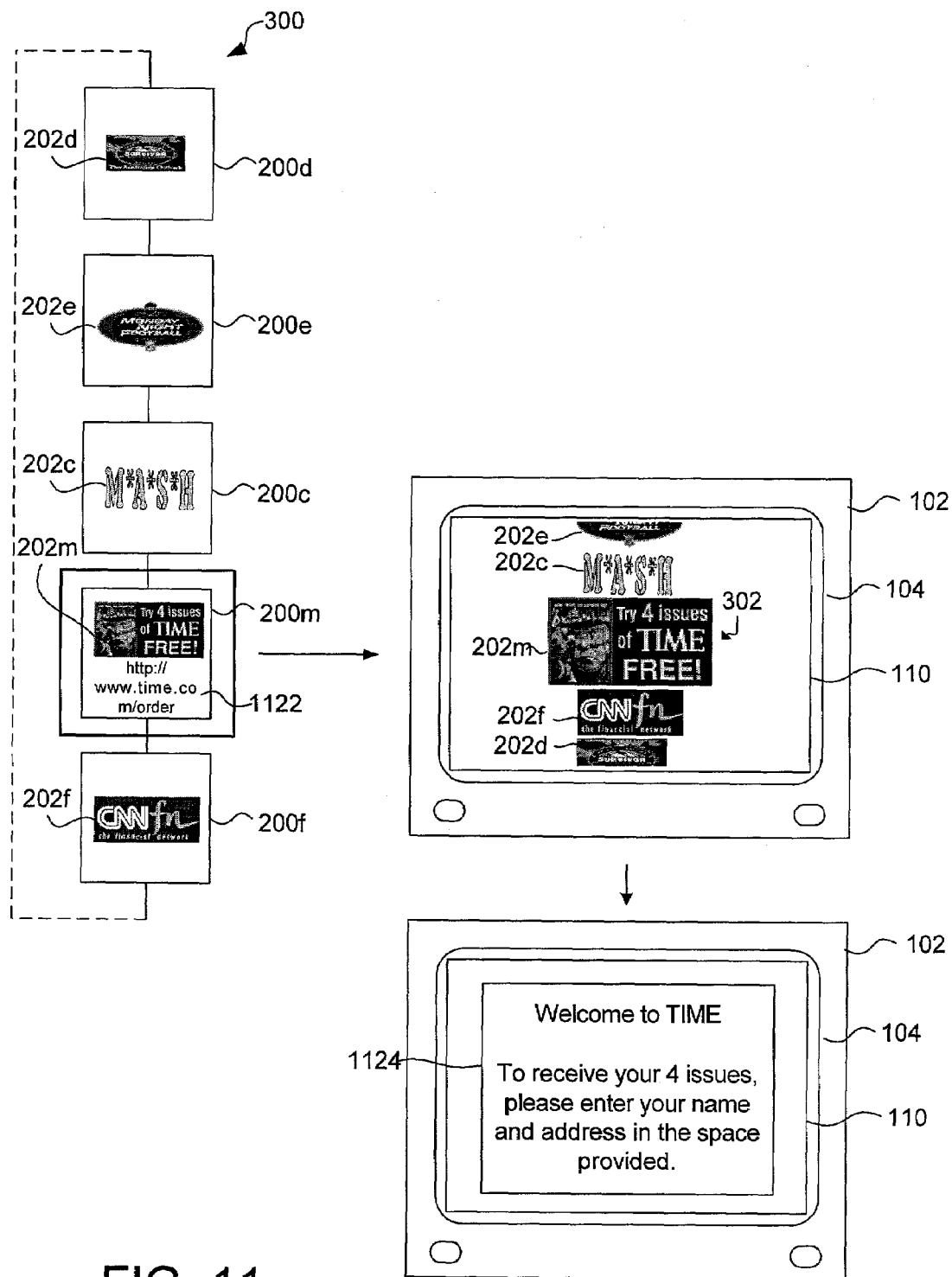

As illustrated in FIG. 11, different types of cards 200 may be included within a single sequence 300. For example, cards 200c–f may correspond to television programs, while card 200m represents a purchase opportunity. In the depicted embodiment, card 200m includes a graphical representation 202m (advertisement), as well as a link or network address 1122, such as a uniform resource locator (URL), to a commercial website.

If the card 200m remains in the focus area 302 for a sufficiently long period, or if the user presses the "Select" button 124, the displayed sequence 300 may be replaced by a web browser 1124, which is automatically directed to the network address 1122 associated with the card 200m. Thereafter, the user may elect to proceed with the purchase opportunity or return to the displayed sequence 300 of cards 200.

Figure 12:
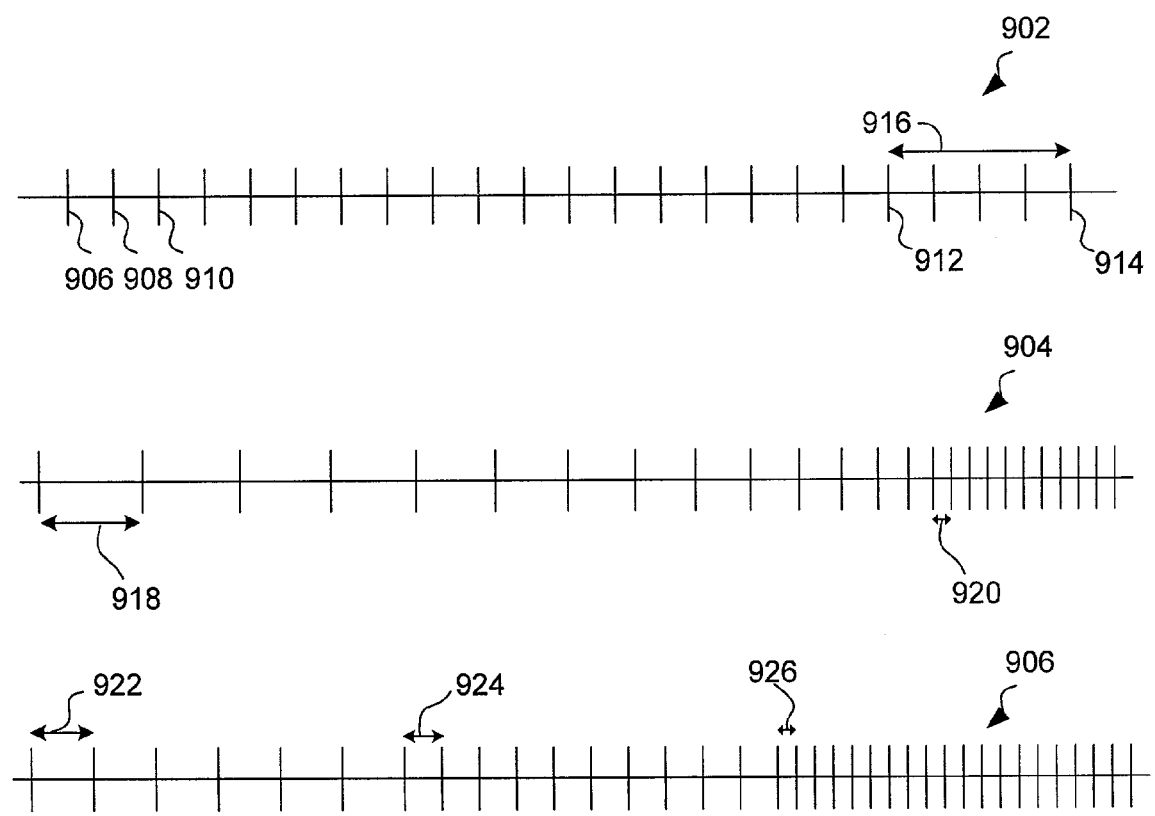
FIG. 12 is a timing diagram for displaying a sequence of cards.

Referring to FIG. 12, there are shown three timing diagrams 902, 904, 906 illustrating the successive display of cards 200 according to embodiments of the invention. Each vertical line within the timing diagrams represents a moment in time at which a particular card 200 is displayed. In diagram 902, after a single user action, cards 200 are successively displayed at moments 906, 908, 910, and so on. When the user takes some additional action to discontinue navigation, the successive display of cards 200 may be halted at moment 912.

In certain instances, the ITV system 100 may automatically compensate for the user's delayed response by reverting to a previously displayed card 200 once the user halts the successive display. For example, if a card 200 representing a desired channel is displayed within the GUI 110 at moment 912, but the user takes the additional action to discontinue navigation at moment 914, the ITV system 100 may be configured to automatically revert to the card 200 displayed a suitable amount of time 916 before the action was taken. The amount of time may be preset or user-defined, or may be calculated based on historical user reaction times.

The rate at which the cards 200 are successively displayed may be increased in response to the user taking a suitable action. For example, as shown in timing diagram 904, the rate at which cards 200 are successively displayed may gradually increase from a minimum rate 918 to a maximum rate 920 (preferably at or below the user's image recognition limit). Alternatively, as shown in timing diagram 906, the display rate may increase from a minimum rate 922 to an intermediate rate 924 to a maximum rate 926 according to a stepwise function. The user action to increase the display rate may take many forms, such as holding down a button on the remote control 108 for a set amount of time. In such case, the rate may be increased based on how long the button is held down. Alternatively, the user may increase the display rate by repeatedly pressing a button on the remote control 108, in which case the rate may be increased each time the button is pressed.

Figure 13:
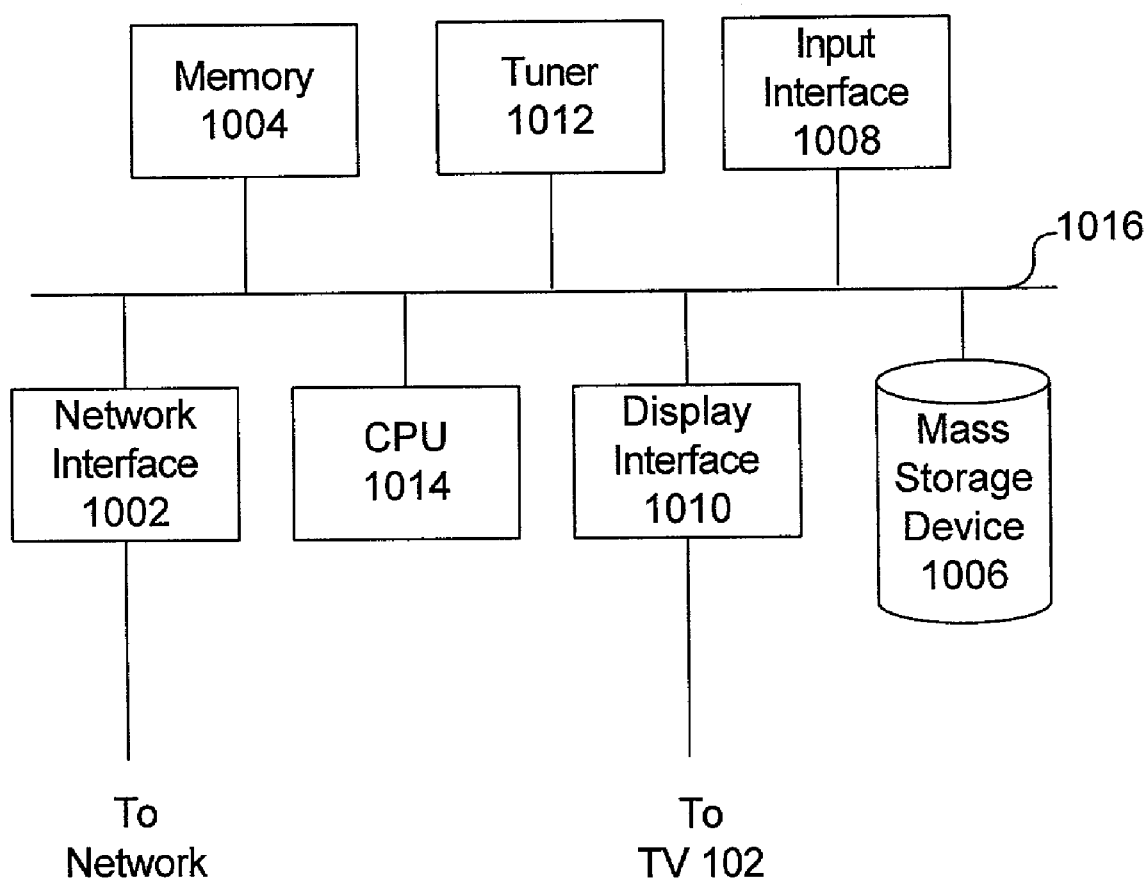
FIG. 13 is a schematic block diagram of a set-top box (STB)

FIG. 13 is a schematic block diagram of an STB 106 according to an embodiment of the invention. The illustrated components may be logical or physical and may be implemented using any suitable combination of hardware, software, and/or firmware.

In one configuration, the STB 106 includes a network interface 1002 for communicating with a broadband network, such as a cable television network or a DBS (Direct Broadcast Satellite) network. The network interface 1002 may conform to the DOCSIS (Data Over Cable Service Interface Specification) or DAVIC (Digital Audio-Visual Council) cable modem standards. Additionally, the network interface 1002 may include standard circuitry for receiving MPEG (Moving Picture Experts Group) streams including multiplexed television programs and data from the broadband network. One or more sequences 300, 600, 700, 800 of cards 200 may be received by the interface 1002 from a server accessible via the broadband network or the Internet.

The STB 106 further includes a memory 1004, such as a random access memory (RAM) and/or read-only memory (ROM). The memory 1004 may store an operating system (OS) for the STB 106 (e.g., Windows CE® or Linux®), application program code, and various types of data. In one embodiment, the memory 1004 stores one or more sequences 300, 600, 700, 800 of cards 200. In other embodiments, the sequences 300, 600, 700, 800 may be stored within a mass storage device 1006, such as a hard disk drive, optical storage device, or the like.

An input interface 1008 may be provided for receiving commands from an input device, such as a remote control 108. In one embodiment, the input interface 1008 may include or be associated with the wireless receiver 114 described in connection with FIG. 1. The input interface 1008 may detect a single user action for initiating navigation, such as the user pressing the "Up" or "Down" buttons 116, 118 on the remote control 108.

The STB 106 may further include a display interface 1010 for generating a GUI 110 on an attached TV 102 or other display device. In addition, the display interface 1010 may be responsible for successively displaying cards 200 from one or more stored sequences 300, 600, 700, 800 in a focus area 302 of the GUI 110 in response to the single user action being detected by the input interface 1008, as previously described. Likewise, the display interface 1010 may be responsible for halting the successive display in response to detection of a subsequent user action.

A tuner 1012 may be included for demodulating and demultiplexing selected MPEG streams received by the STB 106 from the broadband network. The tuner 1012 may be used to tune to a particular television program in response to a user selection of a card 200, e.g., in response to the user pressing the "Select" button 124 or when the user "lingers" on a card 200 in the focus area 302.

A CPU 1014 controls the operation of the STB 106, including the other components described above, which may be in electrical communication with the CPU 1014 via a bus 1016. The CPU 1014 may be embodied as a microprocessor, a microcontroller, a digital signal processor (DSP) or other device known in the art. For instance, the CPU 1014 may be embodied as an Intel® x86 processor. The CPU 1014 may perform logical and arithmetic operations based on program code stored within the memory 1004 or the mass storage device 1006.

Although not shown in FIG. 13, the STB 106 may include other components that allow the STB 106 to communicate with and/or control, via either wireless or other means, multiple televisions, personal computers, and other media storage and presentation devices within a network or location.

Of course, FIG. 13 illustrates only one possible configuration of an STB 106. Those skilled in the art will recognize that various other architectures and components may be provided within the scope of the invention. In addition, various standard components are not illustrated in order to avoid obscuring aspects of the invention.

Referring to FIG. 14, there is shown a flowchart of a method 1100 for focused navigation of a plurality of options within a GUI 110. The method 1100 begins by storing 1102 at least one of sequences 300, 600, 700, 800 of cards 200 representing channels or other available options within an ITV system 100.

In one configuration, the method 1100 waits 1104 for user input. When a single user action is detected 1106, as previously discussed, the cards 200 from the sequence 300, 600, 700, 800 are successively displayed 1108 in a focus area 302 of the GUI 110. This successive display continues until a subsequent user action is detected 1110, at which point the successive display is discontinued and a single card 200 corresponding to a selected option is displayed 1112 within the focus area 302.

Thereafter, depending on the particular type of card 200, various actions may be taken if the user actively selects the card 200 (e.g., presses the "Select" button 124 on the remote control 108) or waits beyond an established time period to either select the card 200, continue navigation, or take some other action. For example, a card 200 in the focus area 302 may be replaced by a video window 402 showing a live television program after a period of inaction (lingering) by the user.

All of the above U.S. patent, U.S. patent application publications, U.S. patent applications, foreign patents, foreign patent applications and non-patent publications referred to in this specification and/or listed in the Application Data Sheet, are incorporated herein by reference, in their entirety.

While specific embodiments and applications of the present invention have been illustrated and described, it is to be understood that the invention is not limited to the precise configuration and components disclosed herein. Various modifications, changes, and variations apparent to those skilled in the art may be made in the arrangement, operation, and details of the methods and systems of the present invention disclosed herein without departing from the spirit and scope of the invention.

What is claimed is:

1. A method for navigation of television program listings within a user interface, the method comprising:
    moving a first set of visual cards in a linear sequence through a single focus area that is both vertically and horizontally fixed within the user interface;
    moving a second set of visual cards in a linear sequence through the focus area from a perpendicular direction, wherein each visual card of the second set of visual cards represents a respective television program or programming source in a particular broadcast time slot, and wherein no visual card in the first set is also included in the second set; and
    in response to a single user action, replacing the second set of visual cards with a third set of visual cards, each visual card of the third set of visual cards representing a respective television program or programming source in a later broadcast time slot.

2. The method of claim 1, further comprising storing the first set of visual cards.

3. The method of claim 1, further comprising:
    moving the third set of visual cards through the focus area; and
    discontinuing the moving of the third set of visual cards in response to a user command to display a particular visual card in the focus area corresponding to a television program or programming source in the later broadcast time slot.

4. The method of claim 3, further comprising:
    enabling selection of the particular visual card in the focus area in response to an additional user action; and
    displaying a television program shown in the broadcast time slot represented by the particular visual card.

5. The method of claim 4, wherein selection of the particular visual card is in response to a single user action.

6. The method of claim 1, wherein each visual card of the second set graphically represents its associated television program or programming source.

7. The method of claim 1, wherein at least one television programming source comprises a broadcast television channel.

8. The method of claim 1, wherein at least one television programming source comprises a broadcast television network.

9. The method of claim 1, wherein the moving of the first set of visual cards is initiated in response to a single user action.

10. The method of claim 1, further comprising storing the second set of visual cards.

11. The method of claim 1, further comprising replacing the third set of visual cards with a fourth set of visual cards in response to a user command, each visual card of the fourth set of visual cards representing a television program or programming source in an earlier broadcast time slot.

12. The method of claim 1, further comprising displaying a time slot indicator that provides an indication of a first broadcast time slot represented by the visual card in the focus area in addition to a next broadcast time slot associated with a set of visual cards that will replace the currently-displayed set of visual cards in response to the single user action.

13. The method of claim 12, further comprising updating the time slot indicator in response to replacing the first set of cards with the third set of cards to reflect a new broadcast time slot represented by the visual card in the focus area.

14. A system for focused navigation of a plurality of television programs within a user interface, the system comprising:
    a user input detector configured to detect actions of a user; and
    a processor configured to move a first set of visual cards in a linear sequence through a single focus area that is both vertically and horizontally fixed within the user interface, wherein the processor is also configured to move a second set of visual cards through the focus area from a perpendicular direction, wherein each visual card of the second set of visual cards represents a respective television program or programming source in a particular broadcast time slot, wherein no visual card of the first set is included in the second set, and wherein the processor is further configured to replace, in response to a single user action, the second set of visual cards with a third set of visual cards, each visual card of the second set of visual cards representing a respective television program or programming source in a later broadcast time slot.

15. The system of claim 14, further comprising a storage device configured to store the visual cards.

16. The system of claim 14, wherein the processor is further configured to:
    move the third set of visual cards through the focus area; and
    discontinue the moving of the third set of visual cards in response to a user command to display a particular visual card in the focus area corresponding to a television program or programming source in the later broadcast television time slot.

17. The system of claim 16, wherein the processor is further configured to enable selection of the particular visual card in the focus area in response to an additional user action, and wherein the processor is further configured to display a television program shown in the particular broadcast television time slot represented by the particular visual card.

18. The system of claim 17, wherein selection of the particular visual card is in response to a single user action.

19. The system of claim 14, wherein each visual card of the second set graphically represents its associated programming source.

20. The system of claim 14, wherein at least one television programming source comprises a broadcast television channel.

21. The system of claim 14, wherein at least one television programming source comprises a broadcast television network.

22. The system of claim 14, wherein the processor initiates movement of the first set of visual cards in response to a single user action.

23. The system of claim 14, further comprising a storage device configured to store the second set of visual cards.

24. The system of claim 14, wherein the processor is further to replace the third set of visual cards with a fourth set of visual cards in response to a user command, each visual card of the fourth set of visual cards representing a television program or programming source in an earlier broadcast time slot.

25. A system for focused navigation of a plurality of television programs within a user interface, the system comprising:

means for moving a first set of visual cards in a linear sequence through a single focus area that is both vertically and horizontally fixed within the user interface;

means for moving a second set of visual cards in a linear sequence through the focus area from a perpendicular direction, wherein each visual card of the second set of visual cards represents a respective television program or programming source in a particular broadcast time slot, and wherein no visual card in the first set is also included in the second set; and means for replacing, in response to a single user action, the second set of visual cards with a third set of visual cards, each visual card of the third set of visual cards representing a respective television program or programming source in a later broadcast time slot.

26. A method for navigation of television program listings within a user interface, the method comprising:

continuously scrolling a first set of visual cards through a focus area that is both vertically and horizontally fixed within the user interface;

continuously scrolling a second set of visual cards through the focus area from a perpendicular direction, wherein each visual card of the second set of visual cards represents a respective television program or programming source at a particular broadcast time slot, and wherein no visual card of the first set is also included in the second set; and in response to a single user command, replacing the second set of visual cards with a third set of visual cards, each visual card of the third set of visual cards representing a later broadcast time slot associated with the respective television program or programming sources.

* * * * *